United States Patent [19]
Terada

[11] Patent Number: 6,089,760
[45] Date of Patent: Jul. 18, 2000

[54] SHUTTER DEVICE, AND APPARATUS HAVING THE SAME

[75] Inventor: Shuichi Terada, Tokyo, Japan

[73] Assignee: Canon Kabushiki Kaisha, Tokyo, Japan

[21] Appl. No.: 09/072,222

[22] Filed: May 4, 1998

[30] Foreign Application Priority Data

May 13, 1997 [JP] Japan ..................................... 9-122183

[51] Int. Cl.$^7$ ..................................................... G03B 9/08
[52] U.S. Cl. ........................... 396/463; 396/497; 396/508
[58] Field of Search ..................................... 396/439, 452, 396/457, 458, 459, 460, 462, 463, 469, 471, 493, 497, 449, 451, 505, 508

[56] References Cited

U.S. PATENT DOCUMENTS 5,745,814  4/1998  Kanbayashi et al. ................... 396/460

*Primary Examiner*—David M. Gray
*Attorney, Agent, or Firm*—Robin, Blecker & Daley

[57] ABSTRACT

A shutter device includes shutter blades, a motor which drives the shutter blades, diaphragm blades which are driven by the motor to perform opening and closing operations, and a transmission mechanism which transmits a driving force of the motor to the shutter blades and the diaphragm blades. In the shutter device, the transmission mechanism transmits the driving force of the motor to the shutter blades and the diaphragm blades in such a manner that driving of the shutter blades by the motor and driving of the diaphragm blades by the motor are made sequential.

28 Claims, 21 Drawing Sheets

F I G. 7
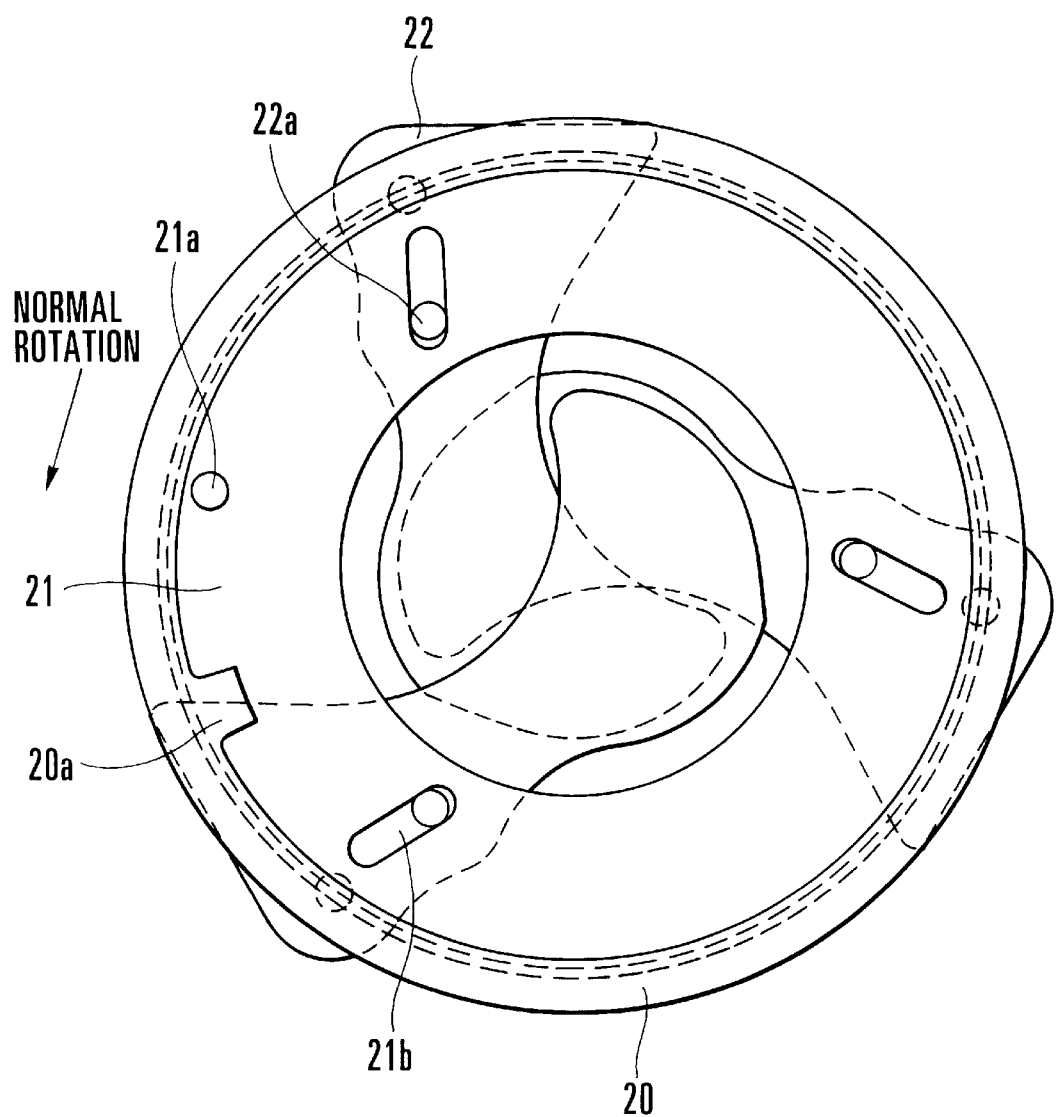

F I G. 10
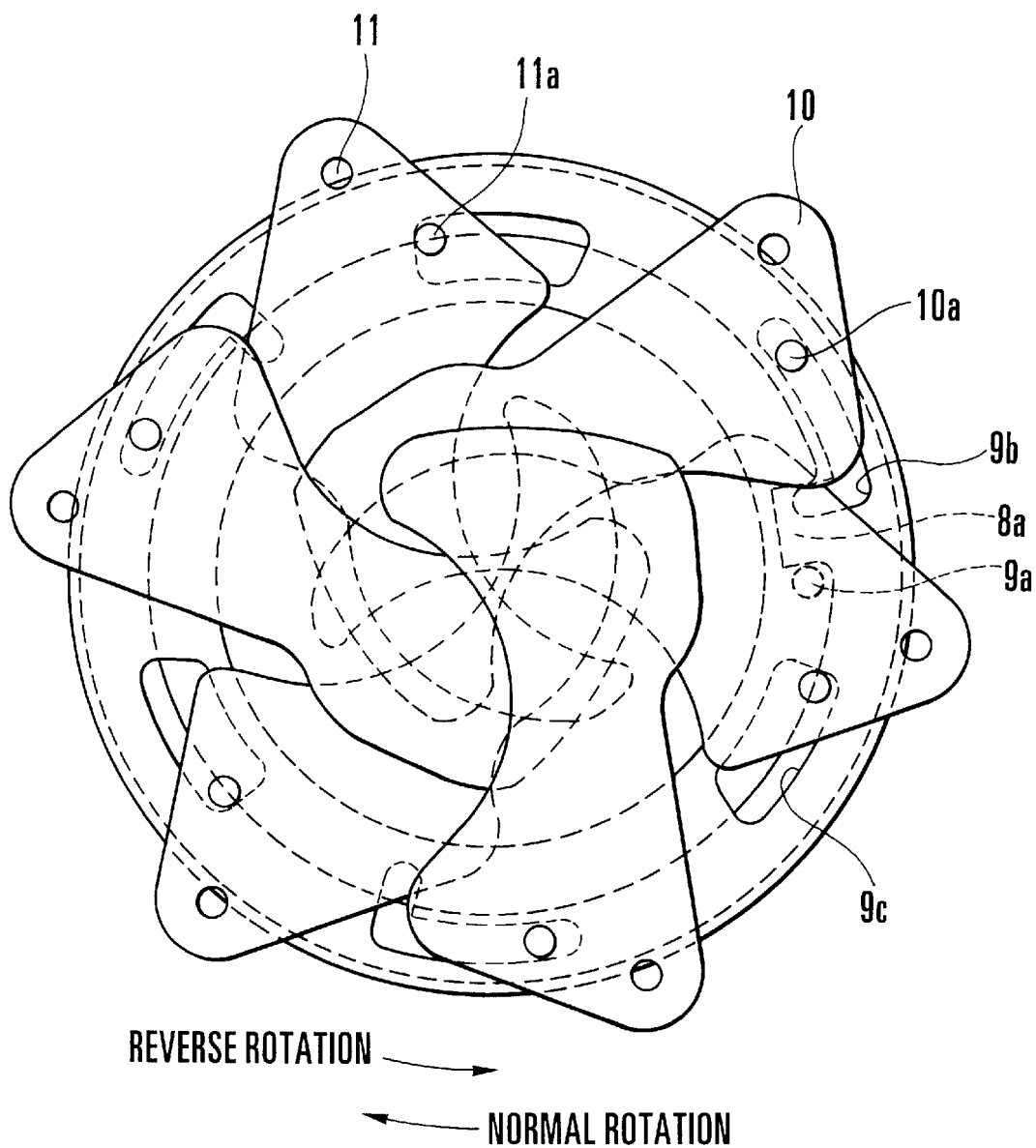

REVERSE ROTATION →

← NORMAL ROTATION

REVERSE ROTATION →
← NORMAL ROTATION

REVERSE ROTATION →

← NORMAL ROTATION

REVERSE ROTATION →

← NORMAL ROTATION

SHUTTER DEVICE, AND APPARATUS HAVING THE SAME

BACKGROUND OF THE INVENTION

1. Field of the Invention

The present invention relates to an improvement on a shutter device.

2. Description of Related Art

A conventional lens shutter is composed of a plurality of diaphragm blades for configuring an aperture close to a circular shape. As exemplified by Japanese Laid-Open Patent Application No. Hei 6-25026, there has been known a shutter device in which aperture correcting blades are provided to correct the aperture configuration in association with light-shielding blades, and during the opening and closing operations, the aperture correcting blades operate in conjunction with the light-shielding blades to shape an aperture into a generally pentagonal configuration.

In addition, Japanese Laid-Open Patent Application No. Hei 4-128727 discloses a diaphragm device in which two supporting points are provided on each of a plurality of diaphragm blades and are fitted in cam slots made in two cam members so that an aperture configuration approaches a circle depending upon the positional relationship between the cam slots of the two cam members and the diaphragm blades.

Moreover, Japanese Laid-Open Patent Application No. Sho 63-157134 discloses a shutter device in which a plurality of diaphragm blades and a cam ring having cam slots are provided and blades are placed in order to go over the minimum aperture to produce a fully closed condition, with only a cam slot for the blades making the fully closed condition being formed to differ from the cam slots for the other blades so as to reduce the full-closure load and the interference at the full closure.

Furthermore, Japanese Laid-Open Patent Application No. Hei 5-45698 discloses a camera shutter device in which, in a conventional lens shutter, the exposure time and the aperture diameter are controllable independently of each other. This shutter device comprises a set of sector members for opening and closing an aperture, a sector opening and closing member linking with the sector members, and an aperture diameter setting means having a cam edge for driving the sector opening and closing member in the closing direction. The sector members are released from the locked condition to open by the rotation of the aperture diameter setting means, and the aperture diameter setting means is rotated in the reverse direction within a delay time taken until the sector members reach a predetermined aperture configuration after initiating the opening operation, so that the sector opening and closing member is urged in the closing direction by the cam edge of the aperture diameter setting means to limit the aperture position, thereby controlling the aperture diameter independently of the exposure.

Still further, in the shutter devices disclosed in Japanese Laid-Open Patent Application No. Hei 7-56211 (corresponding to U.S. patent application Ser. No. 08/287,846 filed on Aug. 9, 1994) and Japanese Laid-Open Patent Application No. Hei 9-15676 (corresponding to U.S. patent application Ser. No. 08/672,600 filed on Jun. 28, 1996), opening blades and closing blades are separately driven to independently control the aperture value and the shutter speed, so that triangular and trapezoidal exposure waveforms are respectively attainable.

However, in the case of the shutter device disclosed in the above Japanese Laid-Open Patent Application No. Hei 5-45698 where the aperture diameter and the exposure time are controlled independently, difficulty is encountered to reverse the aperture diameter setting means until reaching a predetermined aperture value within the delay time when being driven at a high speed, and hence, the speed-up is impossible.

Furthermore, in the shutter devices disclosed in the above Japanese Laid-Open Patent Applications No. Hei 6-250260, No. Hei 4-128727, No. Sho 63-157134, No. Hei 7-56211 and No. Hei 9-15676, since no consideration is given to the compatibility of bringing the diaphragm aperture configuration close to a circle and increasing the shutter speed, for bringing the diaphragm aperture configuration close to a circle, it is necessary to increase the number of blades for the opening and closing operations or the number of diaphragm blades associated with the opening and closing operations, thereby causing the decrease in the shutter speed because the inertial mass of the blades to be driven during the exposure action increases.

Although the possible solution to the decrease in the shutter speed is achieved by strengthening the drive force, for example, by using a large actuator, this leads to an increase in the size of the shutter mechanism and consequently to an increase in the size of the whole camera. Although it is also possible to employ a small-sized but costly actuator which is capable of providing a large drive force, this results in an increase in the cost of the shutter device.

BRIEF SUMMARY OF THE INVENTION

In accordance with one aspect of the invention, there is provided a shutter device in which shutter blades and diaphragm blades are driven with one motor, and a transmission mechanism is arranged to transmit a driving force of the motor to the shutter blades and the diaphragm blades such that driving of the shutter blades by the motor and driving of the diaphragm blades by the motor are made sequential, thereby distributing the load on the motor.

Other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 7 is a front view showing the positional relationship among the first shutter blades 22, the first gear ring 20 and the first cam ring 21 in the opening operation mechanism of the shutter device according to the embodiments of the invention.

FIG. 10 is a front view showing the positional relationship among second shutter blades 10, diaphragm blades 11, a second gear ring 8 and a second cam ring 9 in the closing operation mechanism of the shutter device according to the embodiments of the invention.

DETAILED DESCRIPTION OF THE INVENTION

Hereinafter, preferred embodiments of the present invention will be described in detail with reference to the drawings.

First Embodiment

Referring now to FIGS. 1 to 13 and FIGS. 15 to 19, a description will be taken hereinbelow of a first embodiment of the invention.

Figure 1:
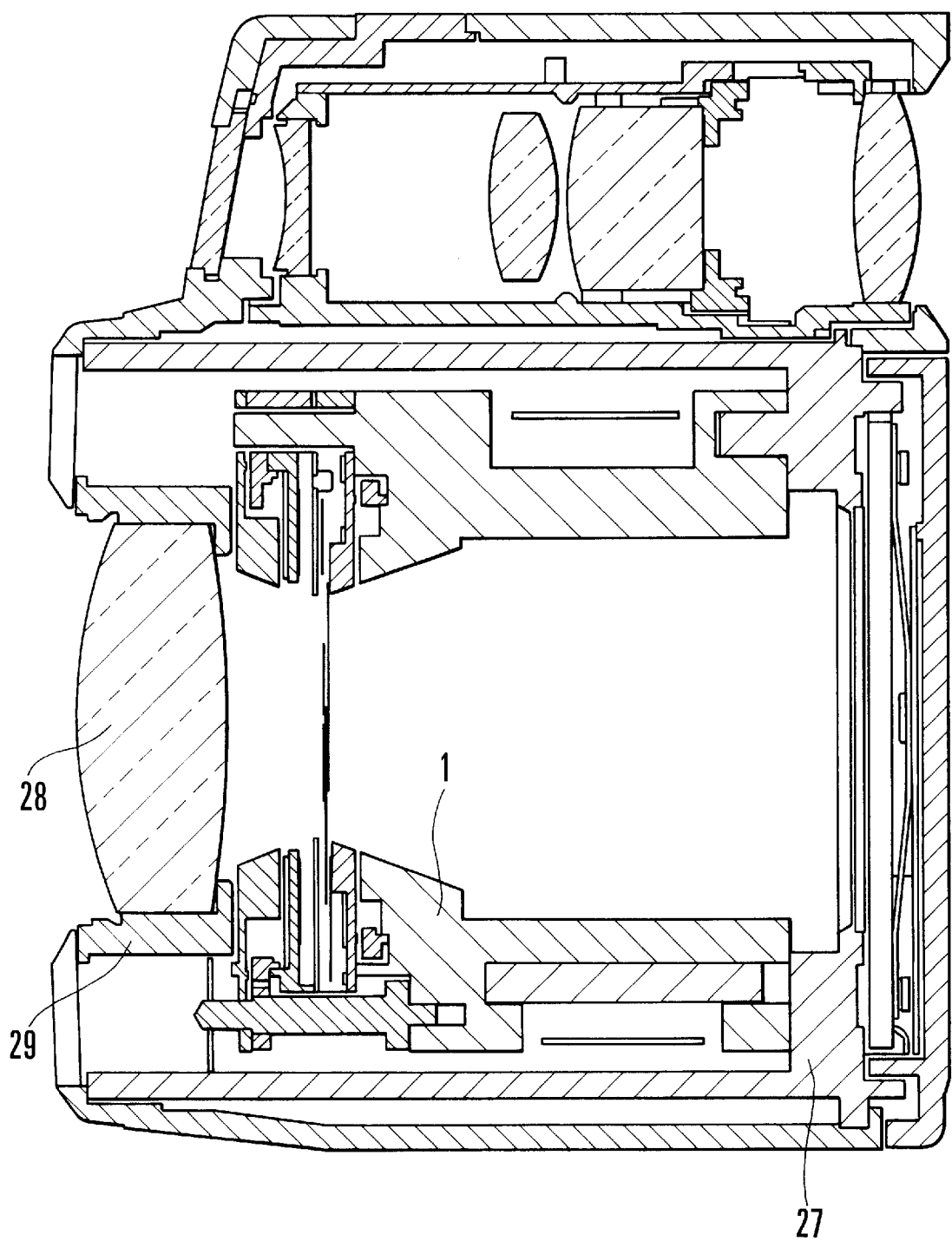
FIG. 1 is a transverse cross-sectional view showing a camera including a shutter device according to embodiments of the invention.
Figure 2:
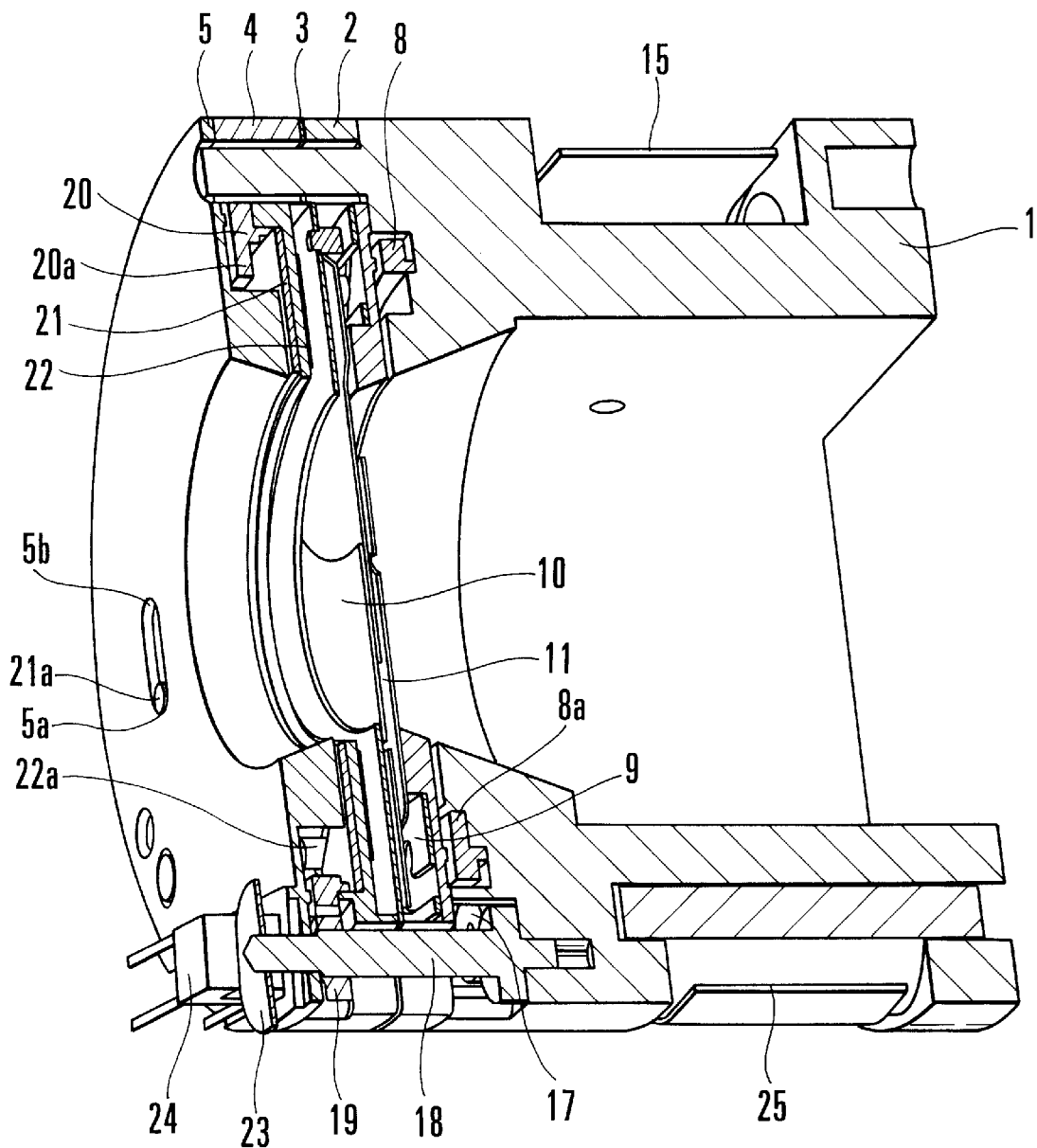
FIG. 2 is a transverse cross-sectional view showing the shutter device according to the embodiments of the invention.
Figure 3:
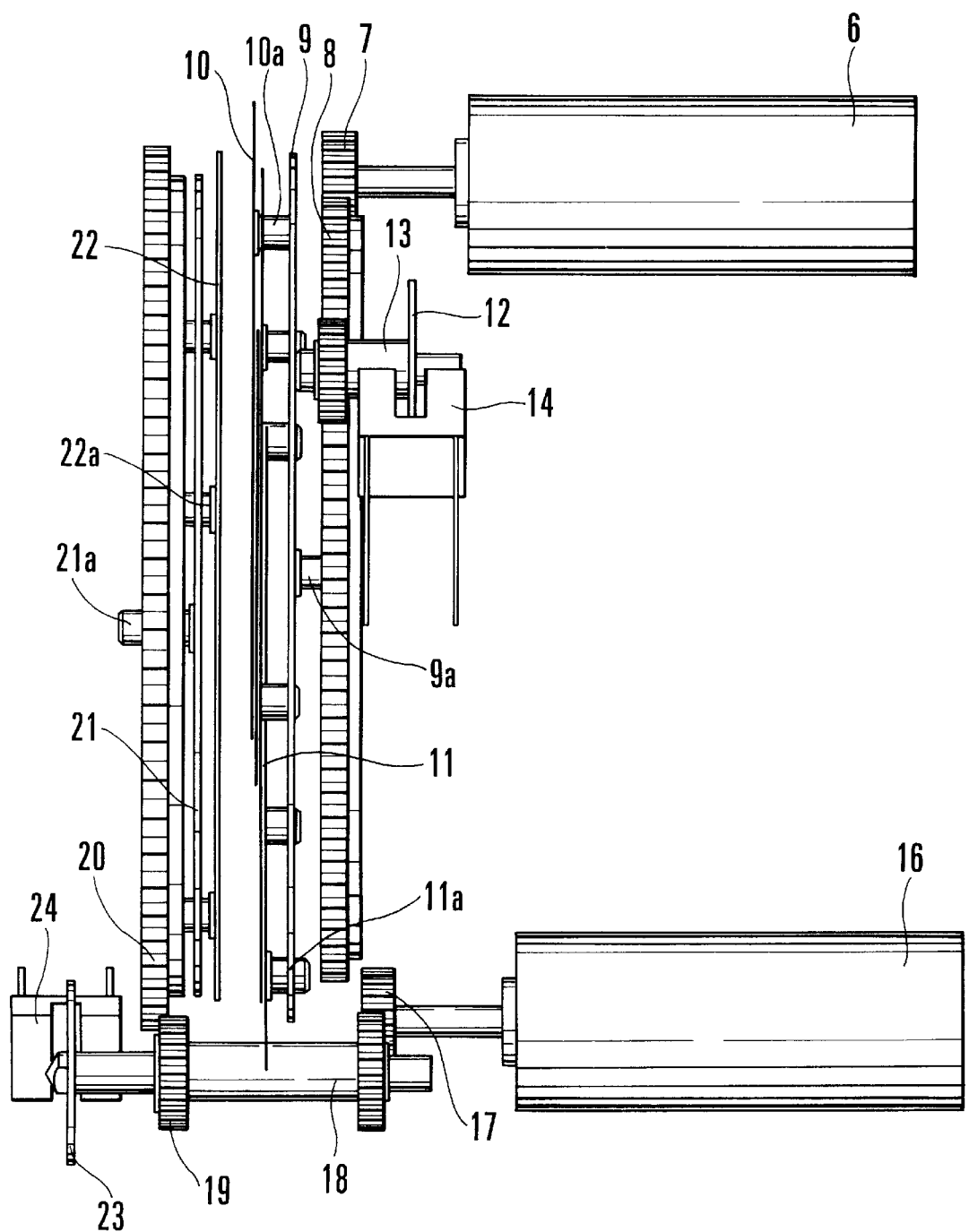
FIG. 3 is a side elevational view showing an opening operation mechanism and a closing operation mechanism of the shutter device according to the embodiments of the invention.

FIG. 1 is a transverse cross-sectional view showing a camera including a shutter device according to the first embodiment, FIG. 2 is a transverse cross-sectional view showing the shutter device, FIG. 3 is a side elevational view for explaining an opening operation mechanism and a closing operation mechanism of the shutter device.

Figure 4:
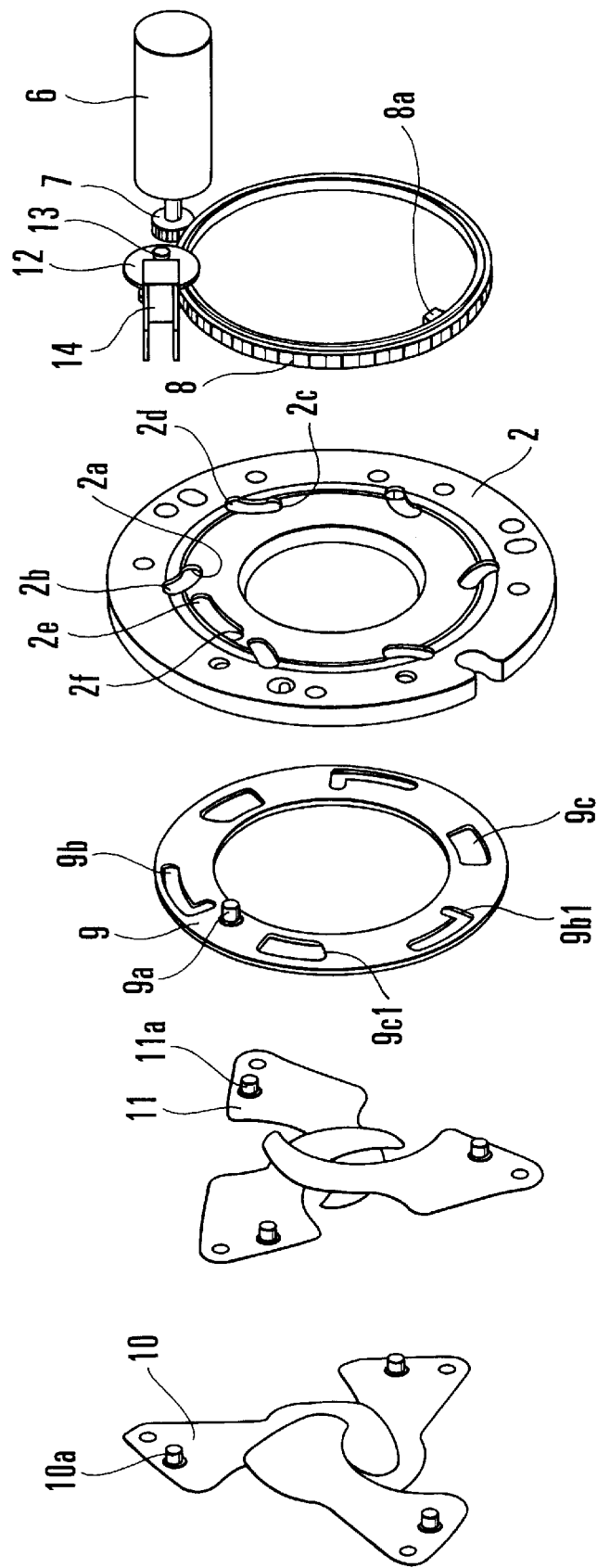
FIG. 4 is an exploded perspective view showing the closing operation mechanism of the shutter device according to the embodiments of the invention.
Figure 5:
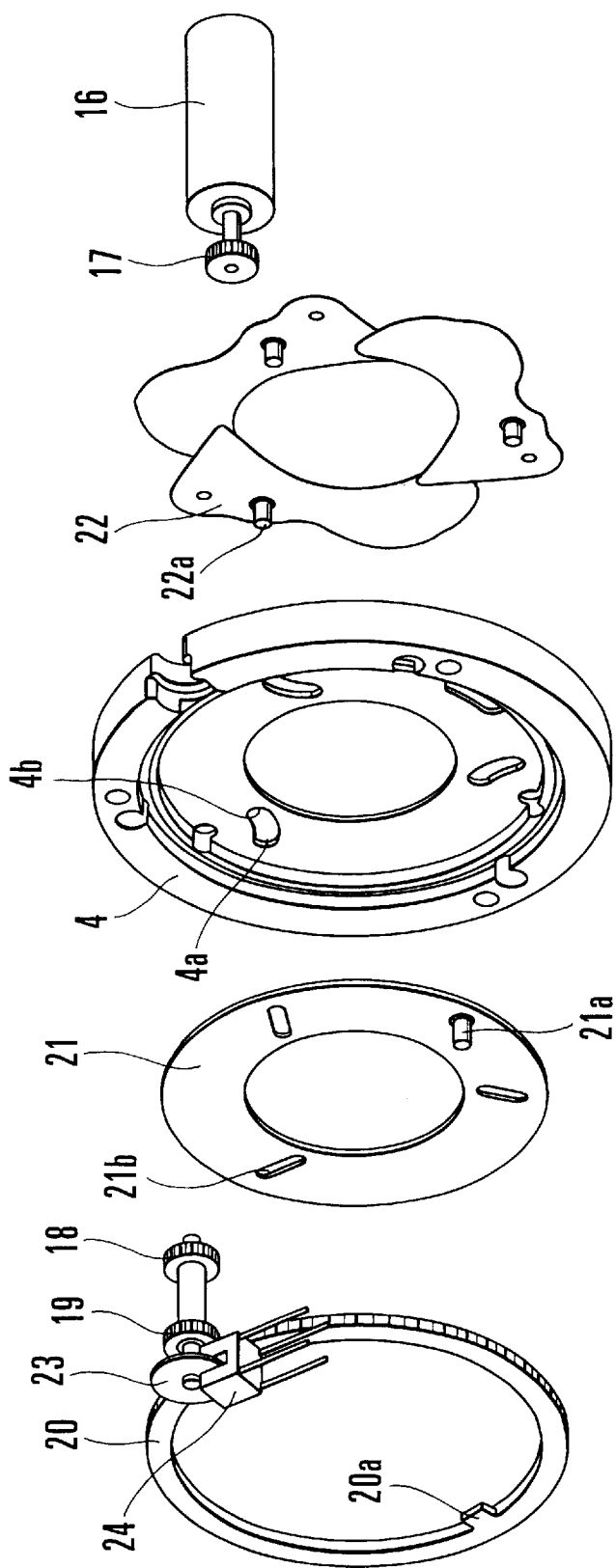
FIG. 5 is an exploded perspective view showing the opening operation mechanism of the shutter device according to the embodiments of the invention.

FIG. 4 is an exploded perspective view showing the closing operation mechanism of the shutter device, FIG. 5 is an exploded perspective view showing the opening operation mechanism of the shutter device.

FIGS. 6 to 9 are front views showing the positional relationship among first shutter blades 22, a first gear ring 20 and a first cam ring 21 in the opening operation mechanism, which performs an opening operation during exposure. In these illustrations, the direction of the normal rotation of the first gear ring 20 and the first cam ring 21 is shown by an arrow.

FIGS. 10 to 13 and FIGS. 15 to 17 are front views showing the positional relationship among second shutter blades 10, diaphragm blades 11, a second gear ring 8 and a second cam ring 9 in the closing operation mechanism, which performs a closing operation during exposure. In these illustrations, the direction of the normal rotation of the second gear ring 8 and the second cam ring 9 is shown by an arrow.

Figure 18:
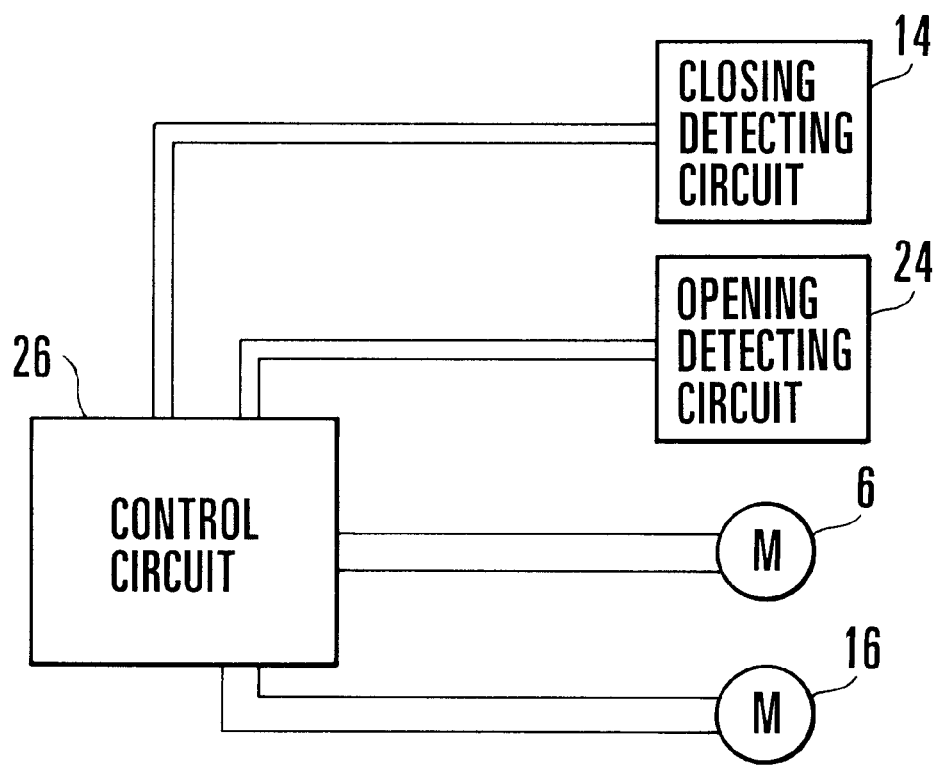
FIG. 18 is an illustration of a circuitry of the shutter device according to the embodiments of the invention.
Figure 19:
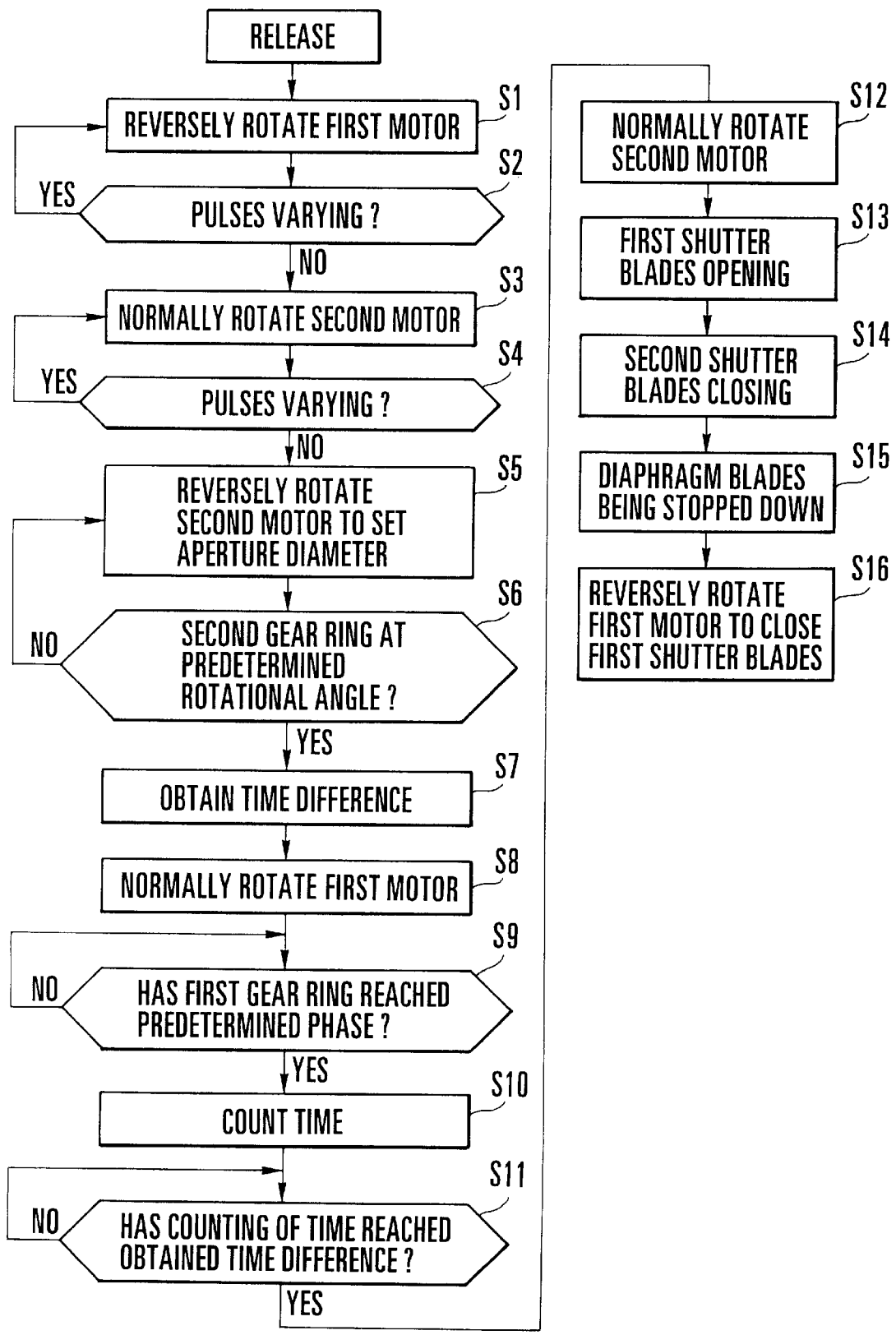
FIG. 19 is a flow chart showing an operation of the shutter device according to a first embodiment of the invention.

FIG. 18 is an illustration of a circuitry of the shutter device, and FIG. 19 is a flow chart showing an operation of the shutter device according to the first embodiment of the invention.

In FIGS. 1 to 19, a first base member 1 supports a second motor 6 serving as a drive source for the closing operation mechanism and a first motor 16 acting as a drive source for the opening operation mechanism in attachment-allowable conditions, and further rotatably bears the second gear ring 8, a gear (A) 18 and a pulse gear 13.

A second base member 2 equipped with an opening-side stopper portion 2e and a closing-side stopper portion 2f with which a pin portion 9a of the second cam ring 9 comes into contact rotatably supports the second cam ring 9 and bears the second shutter blades 10 and the diaphragm blades 11 in the optical axis direction. Further, the second base member 2 is provided with opening-side stopper portions 2a and closing-side stopper portions 2b with which pin portions 10a of the second shutter blades 10 come into contact, and opening-side stopper portions 2c and closing-side stopper portions 2d with which pin portions 11a of the diaphragm blades 11 come into contact.

A third base member 3 has a rotary shaft for rotatably supporting the first shutter blades 22, the second shutter blades 10 and the diaphragm blades 11.

A fourth base member 4 having opening-side stopper portions 4a and closing-side stopper portions 4b with which pin portions 22a of the first shutter blades 22 come into contact rotatably supports the first gear ring 20, and bears the first shutter blades 22 in the optical axis direction.

A fifth base member 5 having an opening-side stopper portion 5a and a closing-side stopper 5b with which a pin portion 21a of the first cam ring 21 comes into contact supports the first gear ring 20 and the first cam ring 21 in the optical axis direction.

The second motor 6 serves source for the closing operation mechanism, and reference numeral 7 designates a pinion fitted over a rotary shaft of the second motor 6.

The second gear ring 8 is rotated through the pinion 7 and has a projection 8a with which the pin portion 9a of the second cam ring 9 comes into contact.

The second cam ring 9 is rotatably supported by the second base member 2 and has the pin portion 9a with which the projection 8a of the second gear ring 8 comes into contact, cam slots 9b for guiding the pin portions 10a of the second shutter blades 10, cam slots 9c for guiding the pin portions 11a of the diaphragm blades 11 and aperture setting portions 9b1 and 9c1.

The second shutter blades 10 have the pin portions 10a and move in the closing direction during exposure, and the diaphragm blades 11 have the pin portions 11a.

Reference numeral 12 signifies a pulse plate for detecting the moving quantity of the second shutter blades 10. The pulse gear 13 engages with the second gear ring 8 and rotates integrally with the pulse plate 12. Reference numeral 14 denotes a detection circuit for sensing pulses due to the rotation of the pulse plate 12 to detect the moving quantity of the second shutter blades 10.

Reference numeral 15 represents a motor cover for fixing the second motor 6 onto the first base member 1.

The first motor 16 serves as a drive source for the opening operation mechanism, and reference numeral 17 designates a pinion attached onto a rotary shaft of the first motor 16.

Reference numeral 18 stands for a gear (A) rotated by the pinion 17, and reference numeral 19 indicates a gear (B) rotating integrally with the gear (A) 18.

The first gear ring 20 is supported rotatably by the fourth base member 4 and the fifth base member 5, and is rotated by the gear (B) 19, and is further equipped with a projection 20a which comes into contact with the pin portion 21a of the first cam ring 21.

The first cam ring 21 is supported rotatably by the fourth base member 4 and is equipped with the pin portion 21a which comes into contact with the projection 20a of the first gear ring 20 and cam slots 21b for guiding the pin portions 22a of the first shutter blades 22.

The first shutter blades 22 have the pin portions 22a.

Reference numeral 23 represents a pulse plate rotating integrally with the gear (A) 18, and reference numeral 24 denotes a detection circuit for detecting pulses due to the pulse plate 23 to detect the moving quantity of the first shutter blades 22.

Reference numeral 25 denotes a motor cover for fixedly securing the first motor 16 onto the first base member 1, reference numeral 26 depicts a control circuit, reference numeral 27 depicts a body for fixing the first base member 1, reference numeral 28 denotes a photographing optical system, and reference numeral 29 denotes a lens holder for holding the photographing optical system 28, which is attached to the fifth base member 5.

In the following description for operation, it is assumed that the direction in which each of the cam rings 9 and 21, the gear rings 8 and 20, the gears 13, 18 and 19 and the motors 6 and 16 is rotated when the first shutter blades 22 are moved in the opening direction and when the second shutter blades 10 are moved in the closing direction is the direction of the normal rotation.

With the above-described construction, in the state that the first shutter blades 22 are in the closed condition, the second shutter blades 10 are in the closed condition and the diaphragm blades 11 are in the fully-closed condition, i.e., in the state that the shutter release operation has ended, if the control circuit 26 receives a release signal produced when the photographer conducts the release operation, the first motor 16 is first rotated in the reverse direction (step S1 in FIG. 19).

With the reverse rotation of the first motor 16, the pinion 17, the gear (A) 18, the gear (B) 19 and the first gear ring 20 are respectively rotated in the reverse direction, so that the projection 20a of the first gear ring 20 comes into contact with the pin portion 21a of the first cam ring 21 to cause the first cam ring 21 to rotate in the reverse direction.

The reverse rotation of the first motor 16 continues until the pin portion 21a of the first cam ring 21 comes into contact with the closing-side stopper portion 5b of the fifth base member 5 so that the first cam ring 21 stops rotating and the pulses caused by the pulse plate 23 remain unvaried for a predetermined period of time (step S2 in FIG. 19).

Figure 6:
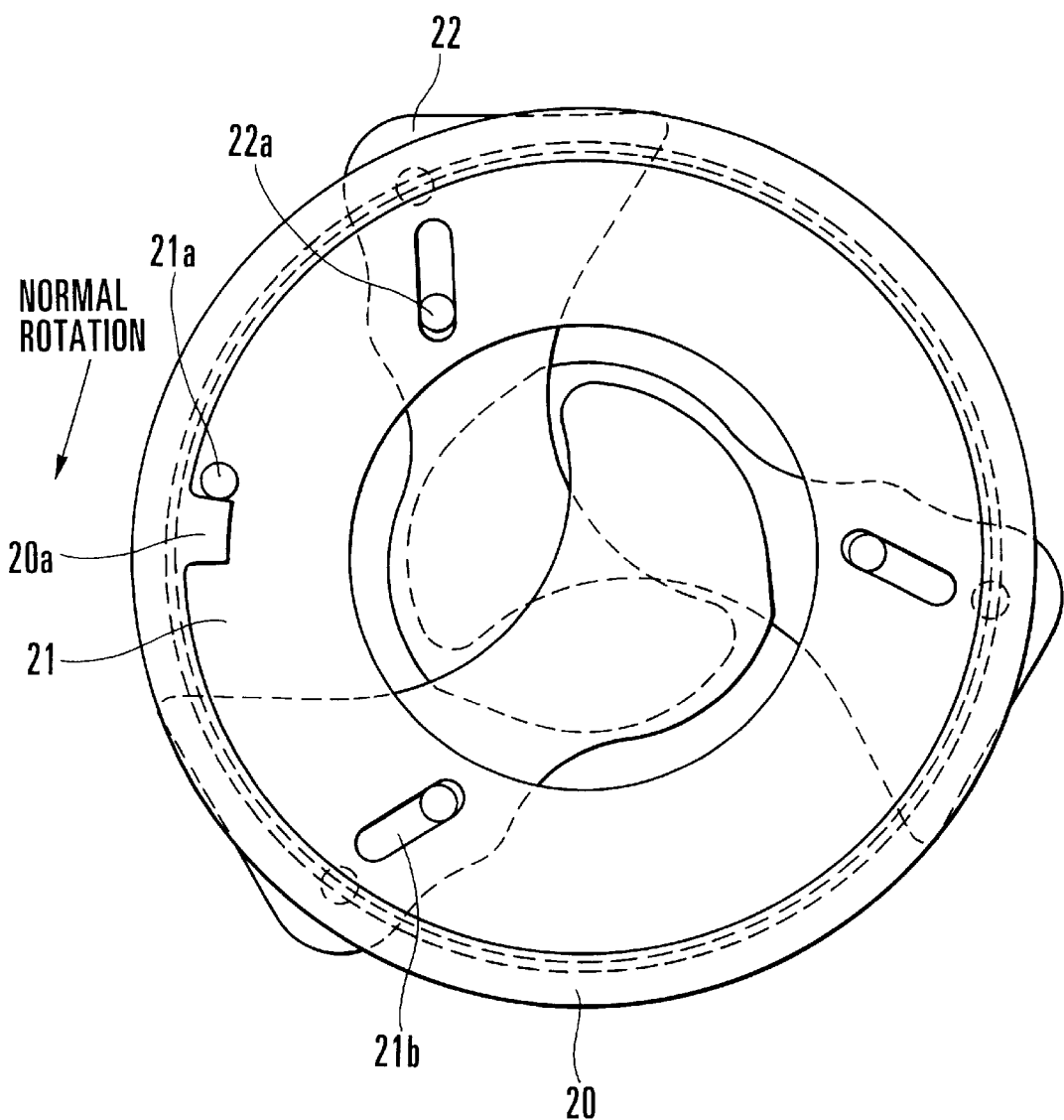
FIG. 6 is a front view showing the positional relationship among first shutter blades 22, a first gear ring 20 and a first cam ring 21 in the opening operation mechanism of the shutter device according to the embodiments of the invention.

Thus, it is confirmed that the first shutter blades 22 are in the closed condition, and such a position as shown in FIG. 6 is set as an initial position for the approach-run of the first gear ring 20.

In this state, the second motor 6 is energized to rotate the second gear ring 8 in the normal direction (step S3 in FIG. 19).

Owing to the normal rotation of the second motor 6, the pinion 7 and the second gear ring 8 rotate in the normal direction, so that the projection 8a of the second gear ring 8 is brought into contact with the pin portion 9a of the second cam ring 9, thereby causing the second cam ring 9 to rotate in the normal direction.

The normal rotation of the second motor 6 continues until the pin portion 9a of the second cam ring 9 comes into contact with the closing-side stopper portion 2f of the second base member 2 so that the second cam ring 9 stops rotating and the pulses caused by the pulse plate 12 remain unvaried for a predetermined period of time (step S4 in FIG. 19).

Thus, it is confirmed that the second shutter blades 10 and the diaphragm blades 11 are in the fully closed condition.

The second motor 6 is energized to rotate in the reverse direction from the position shown in FIG. 10 (step S5 in FIG. 19).

Figure 11:
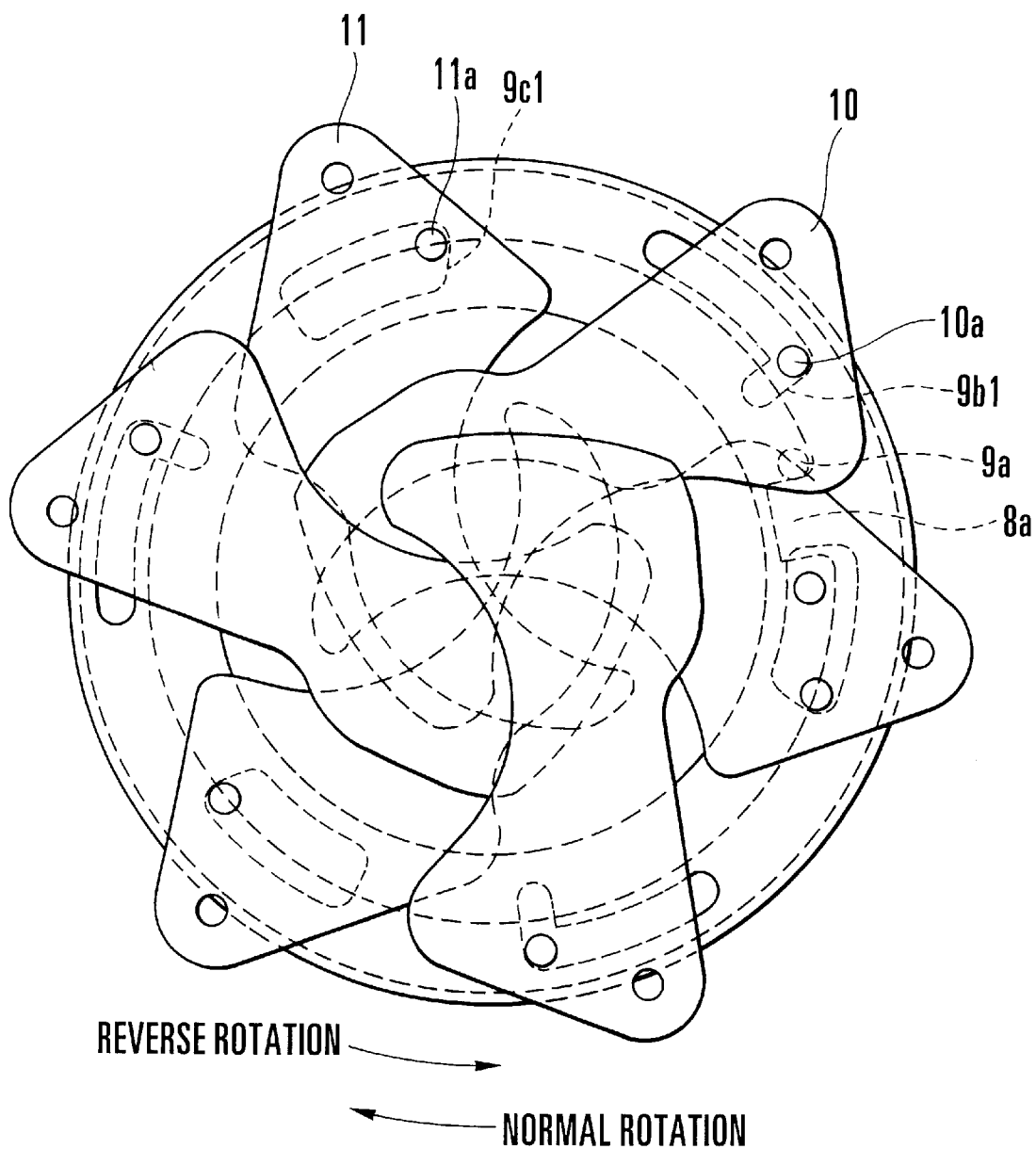
FIG. 11 is a front view showing the positional relationship among the second shutter blades 10, the diaphragm blades 11, the second gear ring 8 and the second cam ring 9 in the closing operation mechanism of the shutter device according to the embodiments of the invention.

When the second gear ring 8 rotates in the reverse direction to reach the position shown in FIG. 11, the second cam ring 9 is rotated by being pushed by the projection 8a of the second gear ring 8, and the aperture setting portions 9b1 and 9c1 of the cam slots 9b and 9c cause the second shutter blades 10 and the diaphragm blades 11 to open simultaneously.

Figure 12:
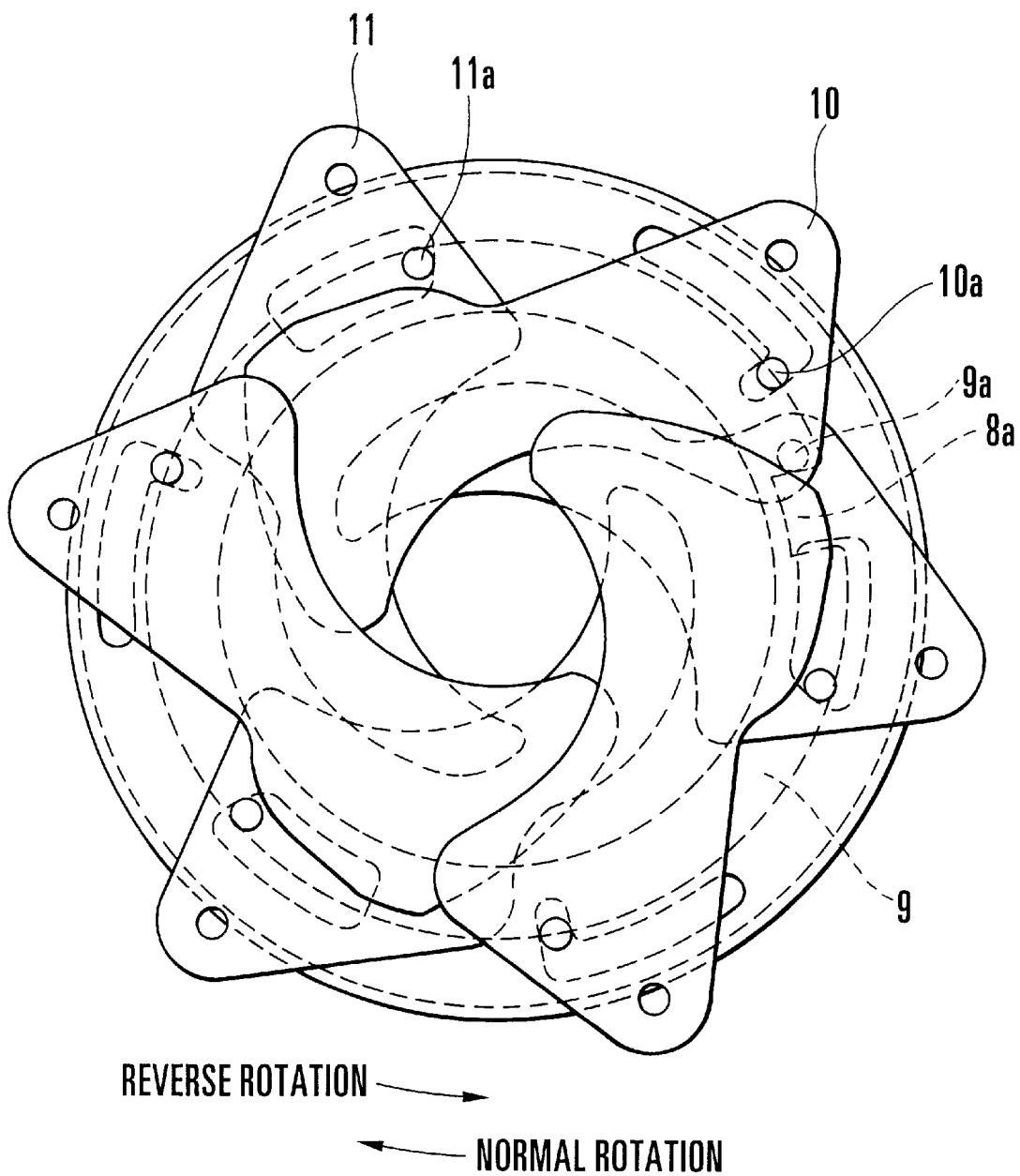
FIG. 12 is a front view showing the positional relationship among the second shutter blades 10, the diaphragm blades 11, the second gear ring 8 and the second cam ring 9 in the closing operation mechanism of the shutter device according to the embodiments of the invention.
Figure 13:
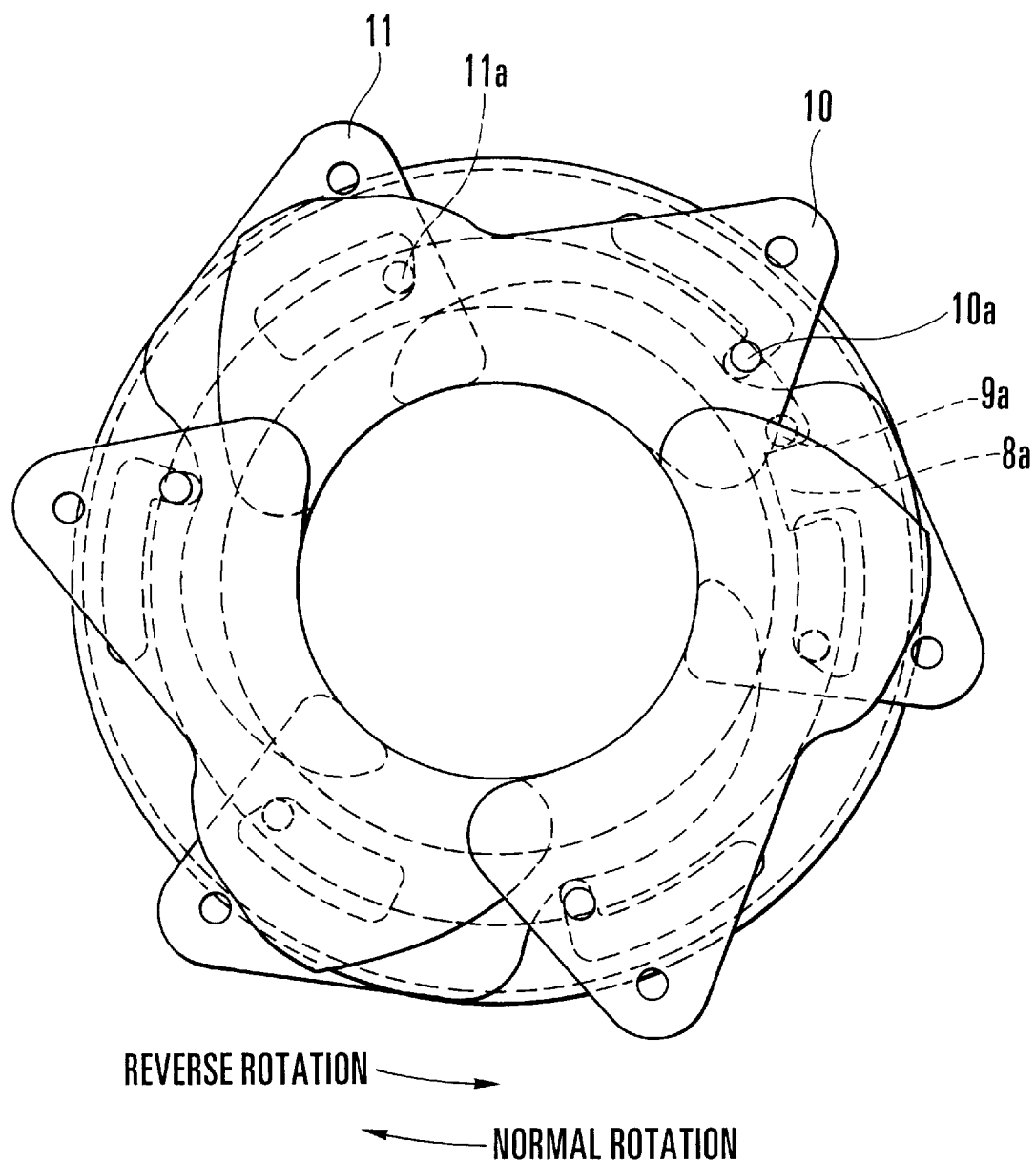
FIG. 13 is a front view showing the positional relationship among the second shutter blades 10, the diaphragm blades 11, the second gear ring 8 and the second cam ring 9 in the closing operation mechanism of the shutter device according to the embodiments of the invention.

The measurement of the rotational angle of the second gear ring 8 is made on the basis of the pulses from the pulse plate 12, and the second gear ring 8 is rotated in the reverse direction up to the rotational angle whereby a desired aperture diameter, for example, shown in one of FIGS. 11 to 13 is obtainable, so that the second shutter blades 10 and the diaphragm blades 11 are opened up to the desired aperture diameter (step S6 in FIG. 19).

Such a position is set as an initial position for the approach-run of the second gear ring 8.

Figure 8:
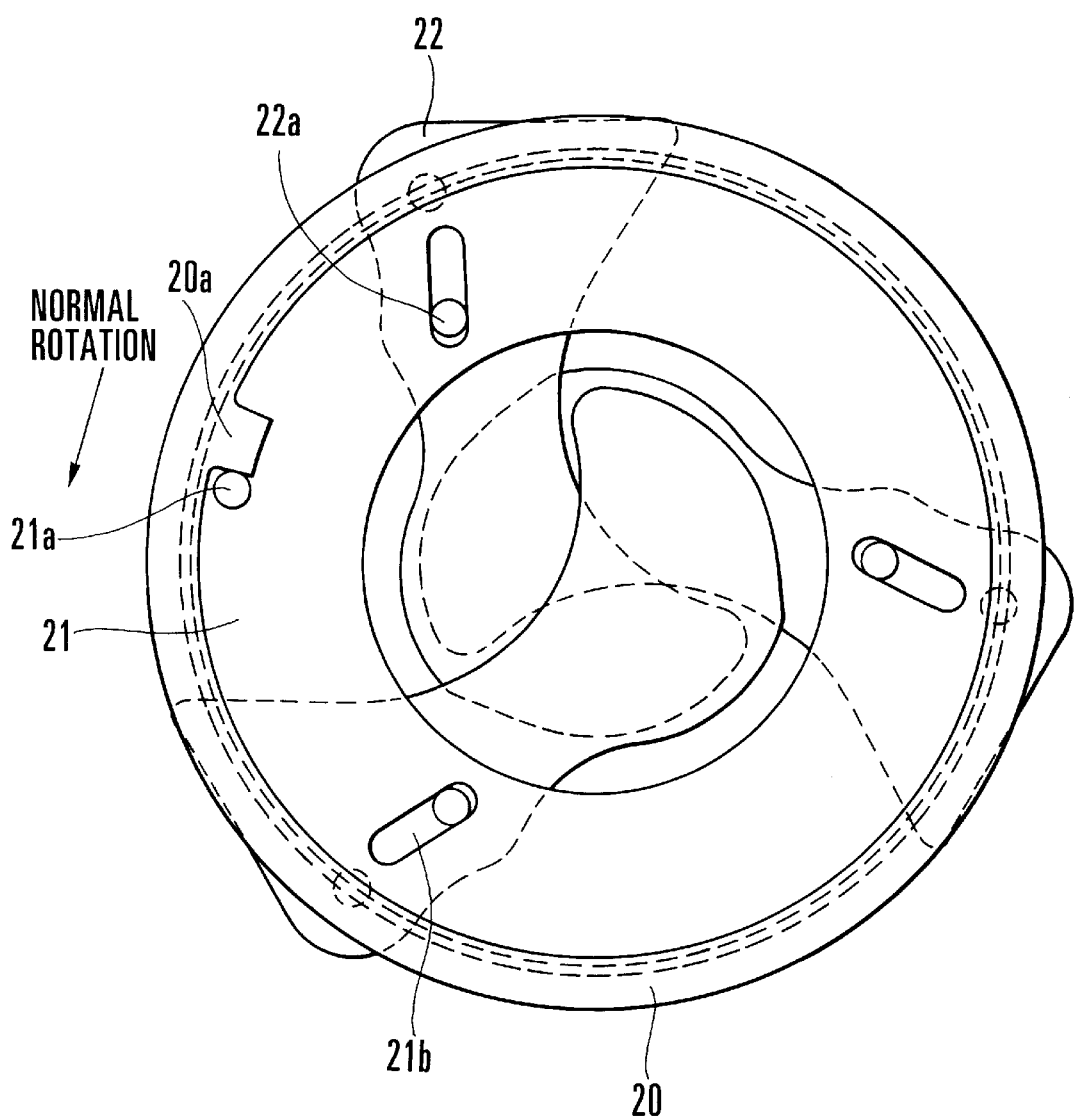
FIG. 8 is a front view showing the positional relationship among the first shutter blades 22, the first gear ring 20 and the first cam ring 21 in the opening operation mechanism of the shutter device according to the embodiments of the invention.
Figure 9:
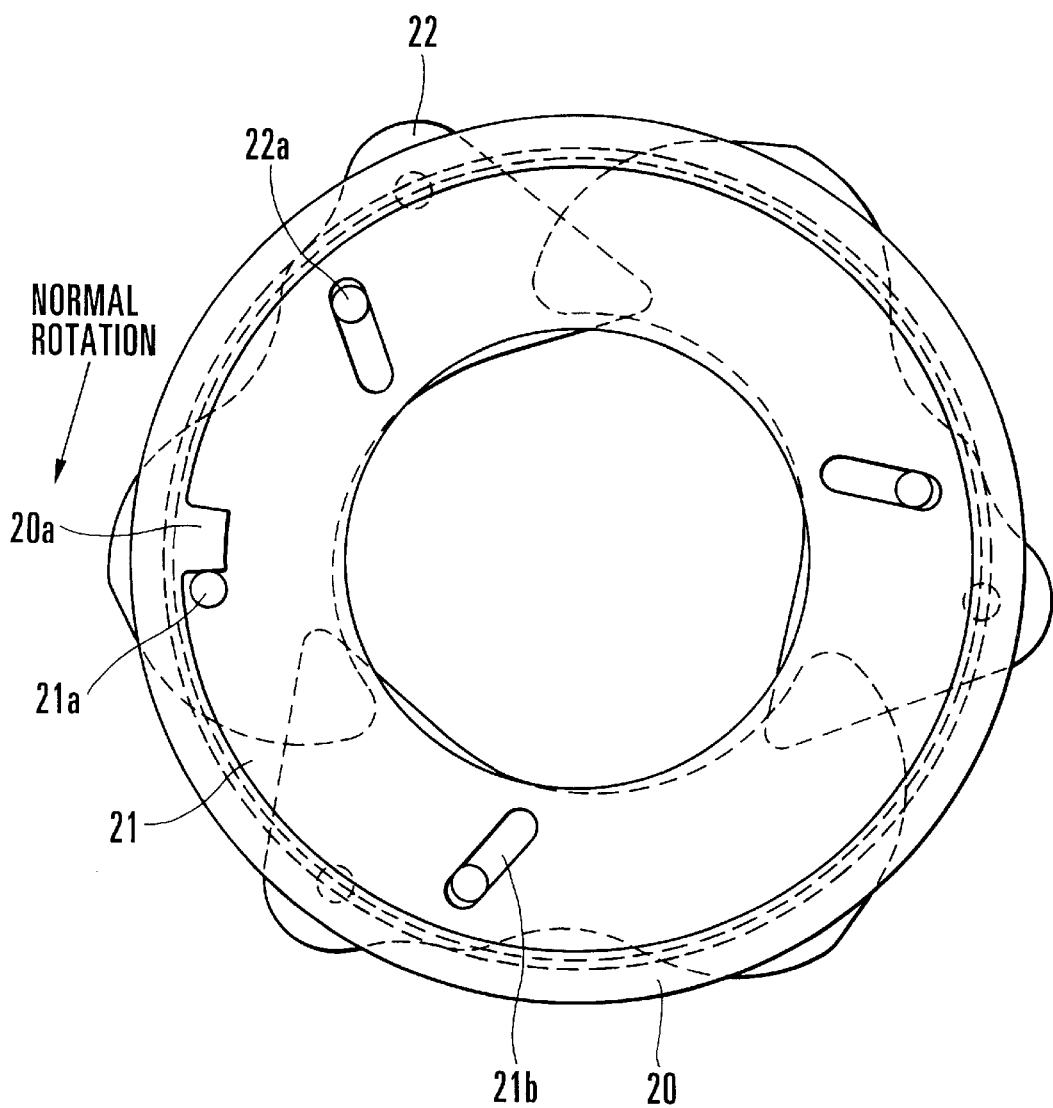
FIG. 9 is a front view showing the positional relationship among the first shutter blades 22, the first gear ring 20 and the first cam ring 21 in the opening operation mechanism of the shutter device according to the embodiments of the invention.

In the above-mentioned state, the rotating interval from the initial position for the approach-run of the first gear ring 20 shown in FIG. 6 to the position shown in FIG. 8 where the projection 20a of the first gear ring 20 runs against the pin portion 21a of the first cam ring 21 after the first gear ring 20 rotates in the normal direction is set as the approach-run interval for the first gear ring 20.

Figure 15:
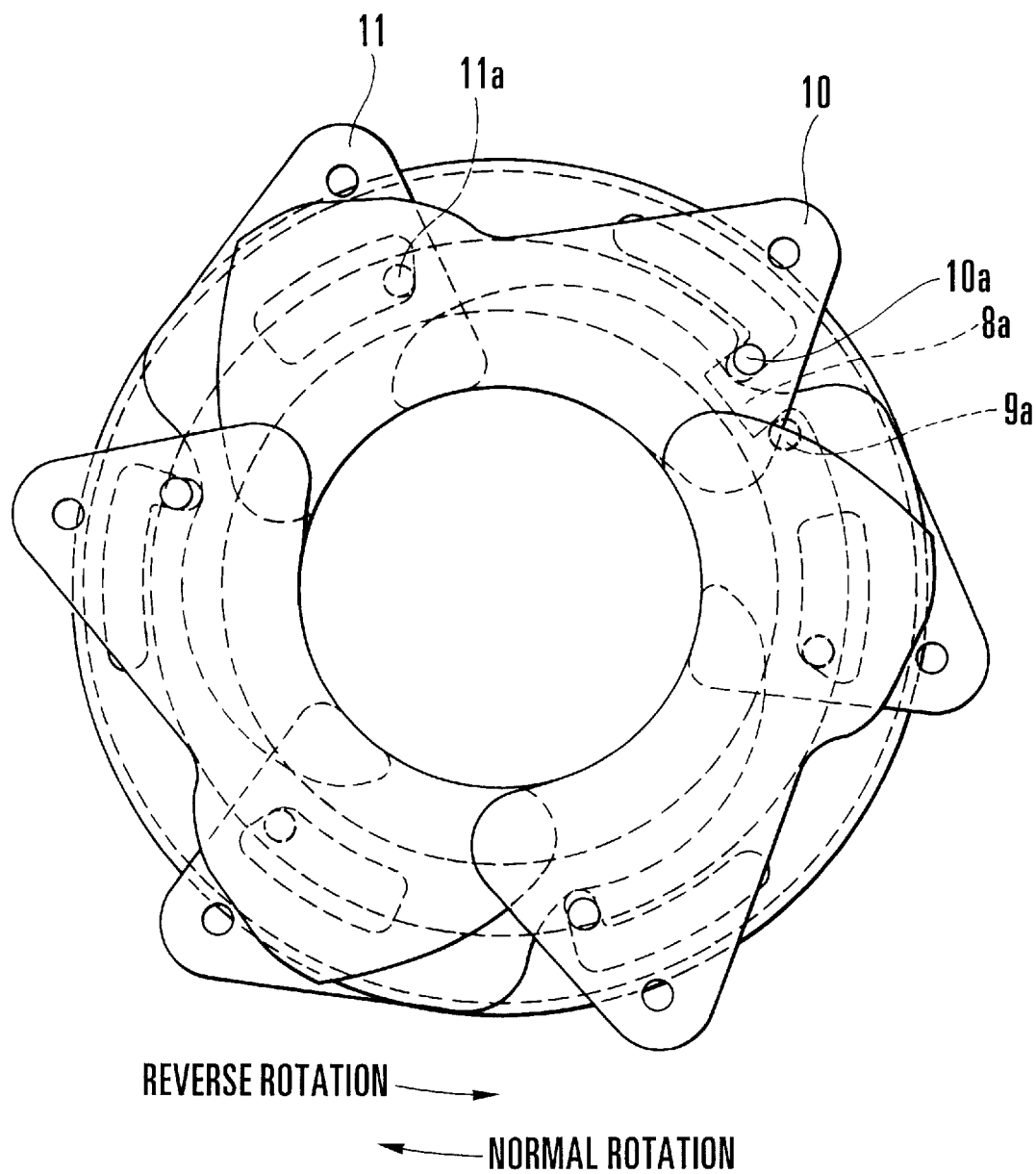
FIG. 15 is a front view showing the positional relationship among the second shutter blades 10, the diaphragm blades 11, the second gear ring 8 and the second cam ring 9 in the closing operation mechanism of the shutter device according to the embodiments of the invention.

Likewise, in the above-mentioned state, the rotating interval from the initial position for the approach-run of the second gear ring 8 to the position shown in FIG. 15 where the projection 8a of the second gear ring 8 runs against the pin portion 9a of the second cam ring 9 after the second gear ring 8 rotates in the normal direction is set as the approach-run interval for the second gear ring 8.

For providing an adequate shutter speed, there is a need to make accurate the time from when the first shutter blades 22 begin to open until the second shutter blades 10 begin the closing operation.

Accordingly, the control circuit 26 obtains the time difference from when the first gear ring 20 starts the approach run and reaches a predetermined position in FIG. 7 where the control circuit 26 starts the time counting operation until the energization for the normal rotation of the second motor 6 starts (step S7 in FIG. 19).

Then, the first motor 16 is rotated in the normal direction (step S8 in FIG. 19).

Due to the normal rotation of the first motor 16, the pinion 17, the gear (A) 18, the gear (B) 19 and the first gear ring 20 are rotated in the normal direction.

When the first gear ring 20 rotates up to a predetermined angle shown in FIG. 7, the control circuit 26 starts the time counting (step S9 and step S10 in FIG. 19).

The control circuit 26 detects the time counting of only the time difference, obtained by the control circuit 26, from when the first gear ring 20 reaches the position in FIG. 7 at which the time counting operation starts until the energization is started to rotate the second motor 6 in the normal direction (step S11 in FIG. 19), and then the second motor 6 comes into the energized condition to rotate in the normal direction (step S12 in FIG. 19).

The normal rotation of the second motor 6 causes the pinion 7 and the second gear ring 8 to rotate in the normal direction.

When the first gear ring 20 rotates in the normal direction and reaches the position shown in FIG. 8, the projection 20a of the first gear ring 20 runs against the pin portion 21a of the first cam ring 21, thereby causing the first cam ring 21 to rotate in the normal direction.

The first shutter blades 22 are opened by the pin portions 22a which are guided by the cam slots 21b of the first cam ring 21, thereby starting the exposure. Further, when the first cam ring 21 rotates up to the position shown in FIG. 9, the first shutter blades 22 come into the fully open condition, and stop by running against the opening-side stopper portion 4a of the fourth base member 4 (step S13 in FIG. 19).

The first cam ring 21 stops with the pin portion 21a coming into contact with the opening-side stopper portion 5a of the fifth base member 5.

When the second gear ring 8 rotates up to the position shown in FIG. 15, the projection 8a of the second gear ring 8 runs against the pin portion 9a of the second cam ring 9 to bring the second cam ring 9 to rotate.

Figure 16:
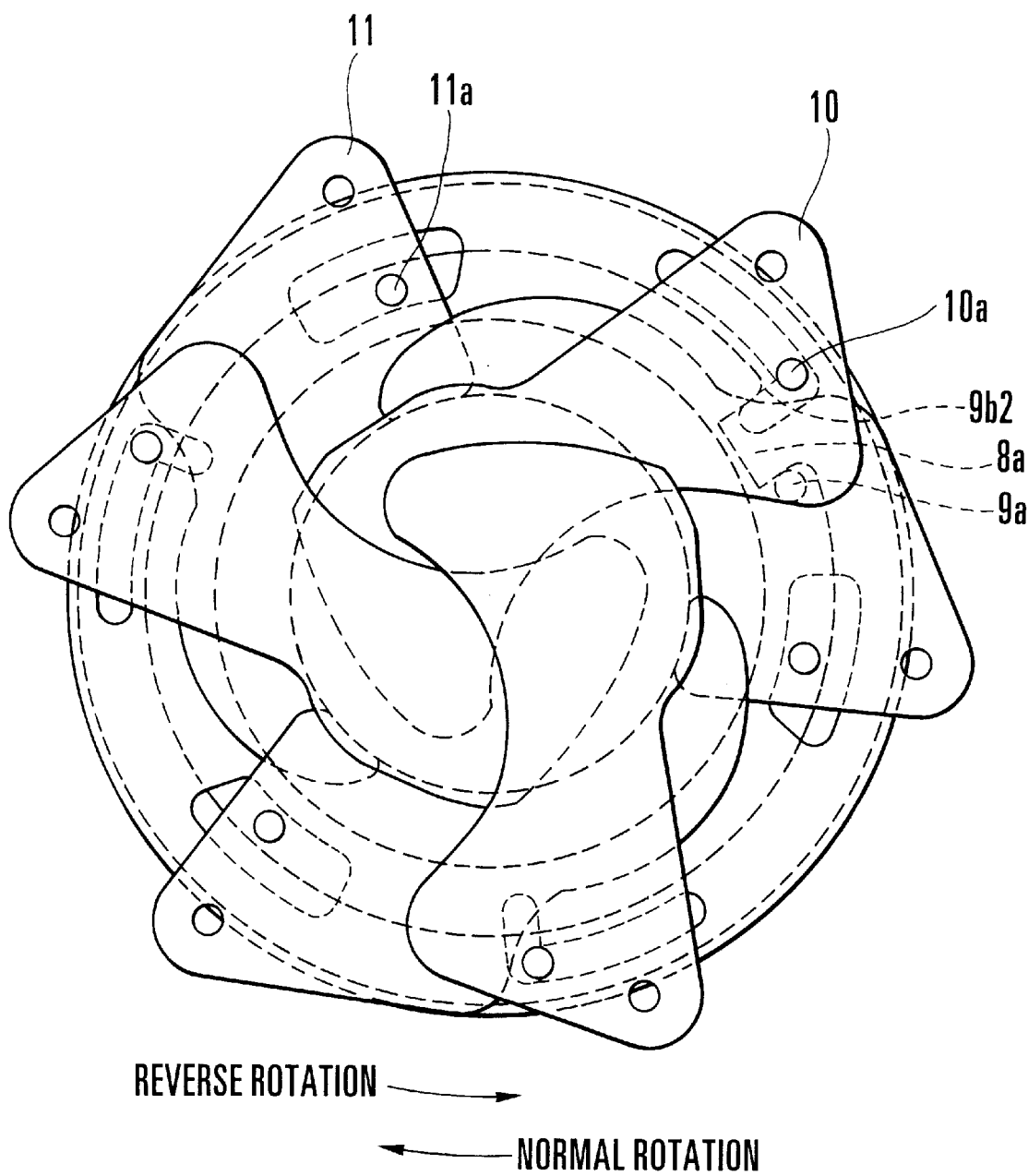
FIG. 16 is a front view showing the positional relationship among the second shutter blades 10, the diaphragm blades 11, the second gear ring 8 and the second cam ring 9 in the closing operation mechanism of the shutter device according to the embodiments of the invention.

As shown in FIG. 16, with the normal rotation of the second cam ring 9, the second shutter blades 10 are closed by the pin portions 10a coming into contact with closing portions 9b2 of the cam slots 9b, and stops by running against the closing-side stopper portions 2b of the second base member 2 (step S14 in FIG. 19).

The closure of the second shutter blades 10 terminates the exposure.

Since only the second shutter blades 10 are closed independently of the diaphragm blades 11, the inertial mass to be driven within the time for the closing operation decreases, and the time required for the shutter closing operation is reduced.

Figure 17:
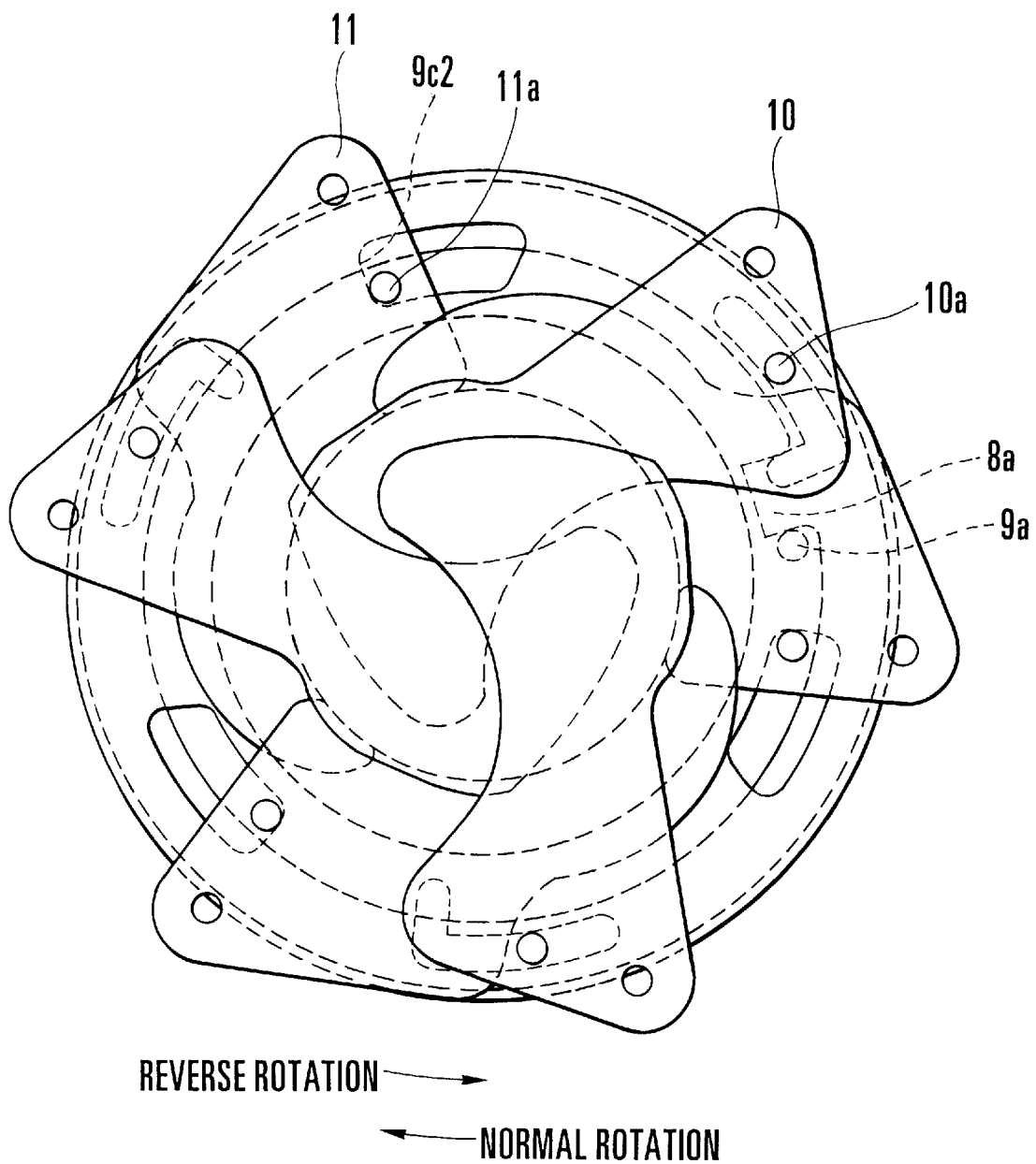
FIG. 17 is a front view showing the positional relationship among the second shutter blades 10, the diaphragm blades 11, the second gear ring 8 and the second cam ring 9 in the closing operation mechanism of the shutter device according to the embodiments of the invention.

After the light shielding by the second shutter blades 10, when the second cam ring 9 further rotates in the normal direction to reach the position shown in FIG. 17, the pin portions 11a of the diaphragm blades 11 come into contact with stopping-down portions 9c2 of the cam slots 9c for the diaphragm blades 11, so that, as shown in FIG. 10, the diaphragm blades 11 are stopped down and stop by coming into contact with the closing-side stopper portions 2d of the second base member 2, thereby accomplishing the reset operation of the diaphragm blades 11 (step S15 in FIG. 19).

The second cam ring 9 stops with the pin portion 9a coming into contact with the closing-side stopper portion 2f of the second base member 2.

The normal rotation of the second motor 6 lasts until the pulses caused by the pulse plate 12 remain unvaried for a predetermined period of time, and after the confirmation of the full closure of the second shutter blades 10, the first motor 16 is rotated in the reverse direction to close the first shutter blades 22, as shown in FIG. 6 (step S16 in FIG. 19).

The reverse rotation of the first motor 16 continues until the pulses caused by the pulse plate 23 remain unvaried for a predetermined period of time to verify the full closure of the first shutter blades 22.

The first embodiment realizes a shutter device in which the aperture diameter and the exposure time are controllable independently of each other and the diaphragm aperture configuration is close to a circle. In addition, for providing the diaphragm aperture configuration closer to a circle, both the second shutter blades and the diaphragm blades are employed, and only the second shutter blades needed for light shielding are closed prior to the diaphragm blades, so that the driving force required for the shutter closing operation is reduced.

In consequence, as compared with the mechanism to simultaneously close the second shutter blades and the diaphragm blades, it is possible to speed up the shutter closing operation so as to attain the high speed shutter.

Second Embodiment

Next, a second embodiment of the invention will be described hereinbelow with reference to FIG. 20. In the second embodiment, its mechanical structure is the same as that of the first embodiment, and the description thereof will be omitted for brevity.

In the following description for operation, it is assumed that the direction in which each of the cam rings 9 and 21, the gear rings 8 and 20, the gears 13, 18 and 19 and the motors 6 and 16 is rotated when the first shutter blades 22 are moved in the opening direction and when the second shutter blades 10 are moved in the closing direction is the direction of the normal rotation.

Figure 20:
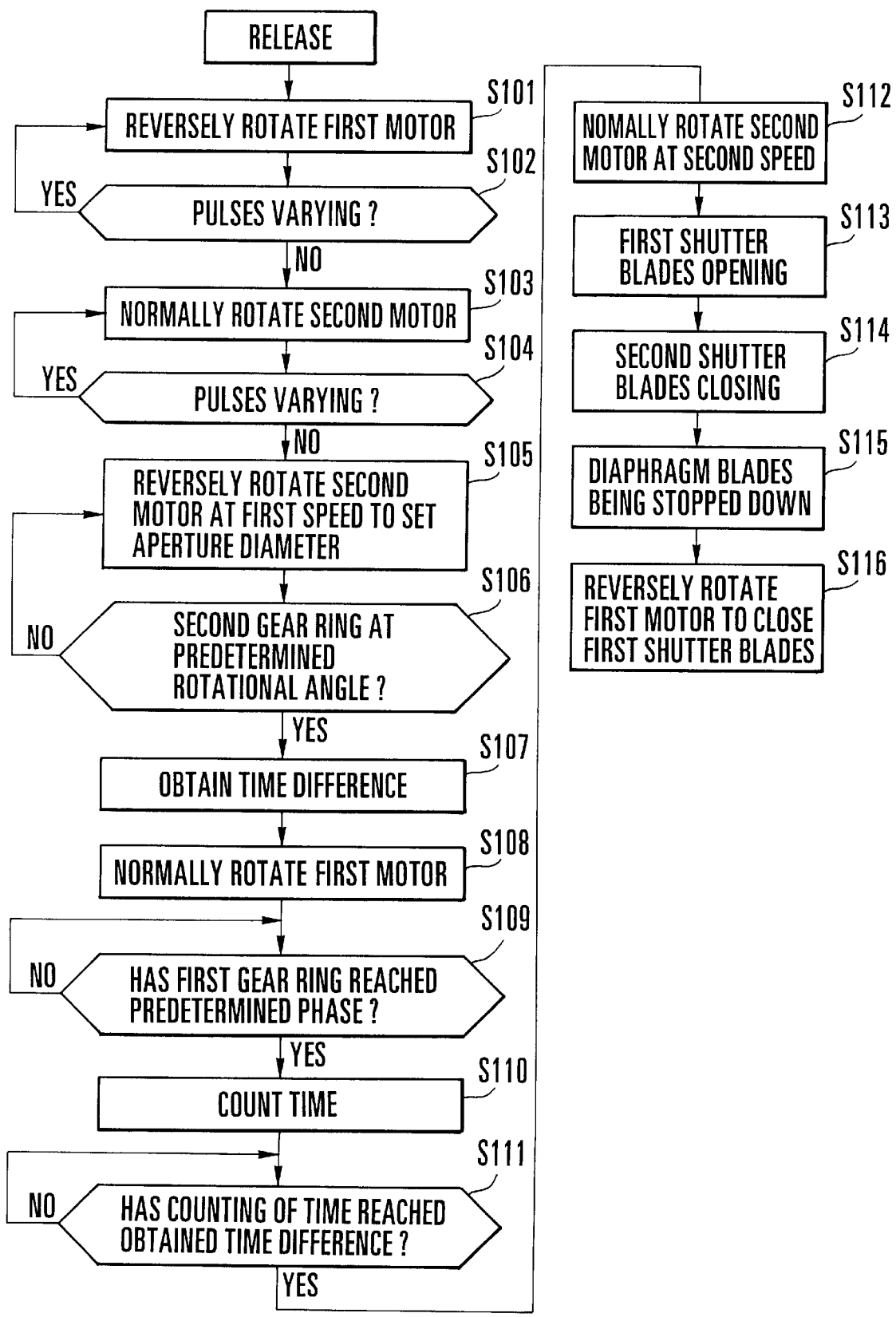
FIG. 20 is a flow chart showing an operation of the shutter device according to a second embodiment of the invention.

With the above-described construction, in the state that the first shutter blades 22 are in the closed condition, the second shutter blades 10 are in the closed condition and the diaphragm blades 11 is in the fully-closed condition, i.e., in the state that the shutter release operation has ended, if the control circuit 26 receives a release signal produced when the photographer conducts the release operation, the first motor 16 is first rotated in the reverse direction (step S101 in FIG. 20).

With the reverse rotation of the first motor 16, the pinion 17, the gear (A) 18, the gear (B) 19 and the first gear ring 20 are respectively rotated in the reverse direction, so that the projection 20a of the first gear ring 20 comes into contact with the pin portion 21a of the first cam ring 21 to cause the first cam ring 21 to rotate in the reverse direction.

The reverse rotation of the first motor 16 continues until the pin portion 21a of the first cam ring 21 comes into contact with the closing-side stopper portion 5b of the fifth base member 5 so that the first cam ring 21 stops rotating and the pulses caused by the pulse plate 23 remain unvaried for a predetermined period of time (step S102 in FIG. 20).

Thus, it is confirmed that the first shutter blades 22 are in the closed condition, and such a position as shown in FIG. 6 is set as an initial position for the approach-run of the first gear ring 20.

In this state, the second motor 6 is energized to rotate the second gear ring 8 in the normal direction (step S103 in FIG. 20).

Owing to the normal rotation of the second motor 6, the pinion 7 and the second gear ring 8 rotate in the normal direction, so that the projection 8a of the second gear ring 8 is brought into contact with the pin portion 9a of the second cam ring 9, thereby causing the second cam ring 9 to rotate in the normal direction.

The normal rotation of the second motor 6 continues until the pin portion 9a of the second cam ring 9 comes into contact with the closing-side stopper portion 2f of the second base member 2 so that the second cam ring 9 stops rotating and the pulses caused by the pulse plate 12 remain unvaried for a predetermined period of time (step S104 in FIG. 20).

Thus, it is confirmed that the second shutter blades 10 and the diaphragm blades 11 are in the fully closed condition.

The second motor 6 is energized to rotate at a first speed in the reverse direction from the position shown in FIG. 10 (step S105 in FIG. 20).

The first speed of the second motor 6 is lower than a second speed which is a drive speed of the second motor 6 during the exposure operation, and is a low speed enough to control the diaphragm aperture diameter at a fine pitch.

When the second gear ring 8 rotates in the reverse direction to reach the position shown in FIG. 11, the second cam ring 9 is rotated by being pushed by the projection 8a of the second gear ring 8, and the aperture setting portions 9b1 and 9c1 of the cam slots 9b and 9c cause the second shutter blades 10 and the diaphragm blades 11 to open simultaneously.

The measurement of the rotational angle of the second gear ring 8 is made on the basis of the pulses from the pulse plate 12, and the second gear ring 8 is rotated in the reverse direction up to the rotational angle whereby a desired aperture diameter, for example, shown in one of FIGS. 11 to 13 is obtainable, so that the second shutter blades 10 and the diaphragm blades 11 are opened up to the desired aperture diameter (step S106 in FIG. 20).

Since the speed of the second motor 6 is sufficiently low, the diaphragm aperture diameter control is easy and becomes possible at a finer pitch.

Such a position is set as an initial position for the approach-run of the second gear ring 8.

In the above-mentioned state, the rotating interval from the initial position for the approach-run of the first gear ring 20 shown in FIG. 6 to the position shown in FIG. 8 where the projection 20a of the first gear ring 20 runs against the pin portion 21a of the first cam ring 21 after the first gear ring 20 rotates in the normal direction is set as the approach-run interval for the first gear ring 20.

Likewise, in the above-mentioned state, the rotating interval from the initial position for the approach-run of the second gear ring 8 to the position shown in FIG. 15 where the projection 8a of the second gear ring 8 runs against the pin portion 9a of the second cam ring 9 after the second gear ring 8 rotates in the normal direction is set as the approach-run interval for the second gear ring 8.

For providing an adequate shutter speed, there is a need to make accurate the time from when the first shutter blades 22 begin to open until the second shutter blades 10 begin the closing operation.

Accordingly, the control circuit 26 obtains the time difference from when the first gear ring 20 starts the approach run and reaches a predetermined position in FIG. 7 where the control circuit 26 starts the time counting operation until the energization for the normal rotation of the second motor 6 starts (step S107 in FIG. 20).

Then, the first motor 16 is rotated in the normal direction (step S108 in FIG. 20).

Due to the normal rotation of the first motor 16, the pinion 17, the gear (A) 18, the gear (B) 19 and the first gear ring 20 are rotated in the normal direction.

When the first gear ring 20 rotates up to a predetermined angle shown in FIG. 7, the control circuit 26 starts the time counting (step S109 and step S110 in FIG. 20).

The control circuit 26 detects the time counting of only the time difference, obtained by the control circuit 26, from when the first gear ring 20 reaches the position in FIG. 7 at which the time counting operation starts until the energization is started to rotate the second motor 6 in the normal direction (step S111 in FIG. 20), and then the second motor 6 comes into the energized condition to rotate at the second speed in the normal direction (step S112 in FIG. 20).

The second speed of the second motor 6 is a speed enough to close the shutter at a high speed.

The normal rotation of the second motor 6 causes the pinion 7 and the second gear ring 8 to rotate in the normal direction.

When the first gear ring 20 rotates in the normal direction and reaches the position shown in FIG. 8, the projection 20a of the first gear ring 20 runs against the pin portion 21a of the first cam ring 21, thereby causing the first cam ring 21 to rotate in the normal direction.

The first shutter blades 22 are opened by the pin portions 22a which are guided by the cam slots 21b of the first cam ring 21, thereby starting the exposure. Further, when the first cam ring 21 rotates up to the position shown in FIG. 9, the first shutter blades 22 come into the fully open condition, and stop by running against the opening-side stopper portion 4a of the fourth base member 4 (step S113 in FIG. 20).

The first cam ring 21 stops with the pin portion 21a coming into contact with the opening-side stopper portion 5a of the fifth base member 5.

When the second gear ring 8 rotates up to the position shown in FIG. 15, the projection 8a of the second gear ring 8 runs against the pin portion 9a of the second cam ring 9 to bring the second cam ring 9 to rotate.

As shown in FIG. 16, with the normal rotation of the second cam ring 9, the second shutter blades 10 are closed by the pin portions 10a coming into contact with closing portions 9b2 of the cam slots 9b, and stops by running against the closing-side stopper portions 2b of the second base member 2 (step S114 in FIG. 20).

The closure of the second shutter blades 10 terminates the exposure.

Since only the second shutter blades 10 are closed independently of the diaphragm blades 11, the inertial mass to be driven within the time for the closing operation decreases, and the time required for the shutter closing operation is reduced.

After the light shielding by the second shutter blades 10, when the second cam ring 9 further rotates in the normal direction to reach the position shown in FIG. 17, the pin portions 11a of the diaphragm blades 11 come into contact with stopping-down portions 9c2 of the cam slots 9c for the diaphragm blades 11, so that, as shown in FIG. 10, the diaphragm blades 11 are stopped down and stops by coming into contact with the closing-side stopper portions 2d of the second base member 2, thereby accomplishing the reset operation of the diaphragm blades 11 (step S115 in FIG. 20).

The second cam ring 9 stops with the pin portion 9a coming into contact with the closing-side stopper portion 2f of the second base member 2.

The normal rotation of the second motor 6 lasts until the pulses caused by the pulse plate 12 remain unvaried for a predetermined period of time, and after the confirmation of the full closure of the second shutter blades 10, the first motor 16 is rotated in the reverse direction to close the first shutter blades 22, as shown in FIG. 6 (step S116 in FIG. 20).

The reverse rotation of the first motor 16 continues until the pulses caused by the pulse plate 23 remain unvaried for a predetermined period of time to verify the full closure of the first shutter blades 22.

The second embodiment realizes a shutter device in which the diaphragm aperture diameter and the exposure time are controllable independently of each other, and the diaphragm aperture configuration is close to a circle. Further, the speed of the second motor at the time of the diaphragm aperture diameter setting is set to be lower than the speed of the second motor at the time of the exposure operation, with the result that it is possible to set the diaphragm aperture diameter at a finer pitch.

Third Embodiment

Moreover, a third embodiment of the invention will be described hereinbelow with reference to FIG. 21. In the third embodiment, its mechanical structure is the same as that of the first embodiment, and the description thereof will be omitted for brevity.

In the following description for operation, it is assumed that the direction in which each of the cam rings 9 and 21, the gear rings 8 and 20, the gears 13, 18 and 19 and the motors 6 and 16 are rotated when the first shutter blades 22 are moved in the opening direction and when the second shutter blades 10 are moved in the closing direction is the direction of the normal rotation.

Figure 21:
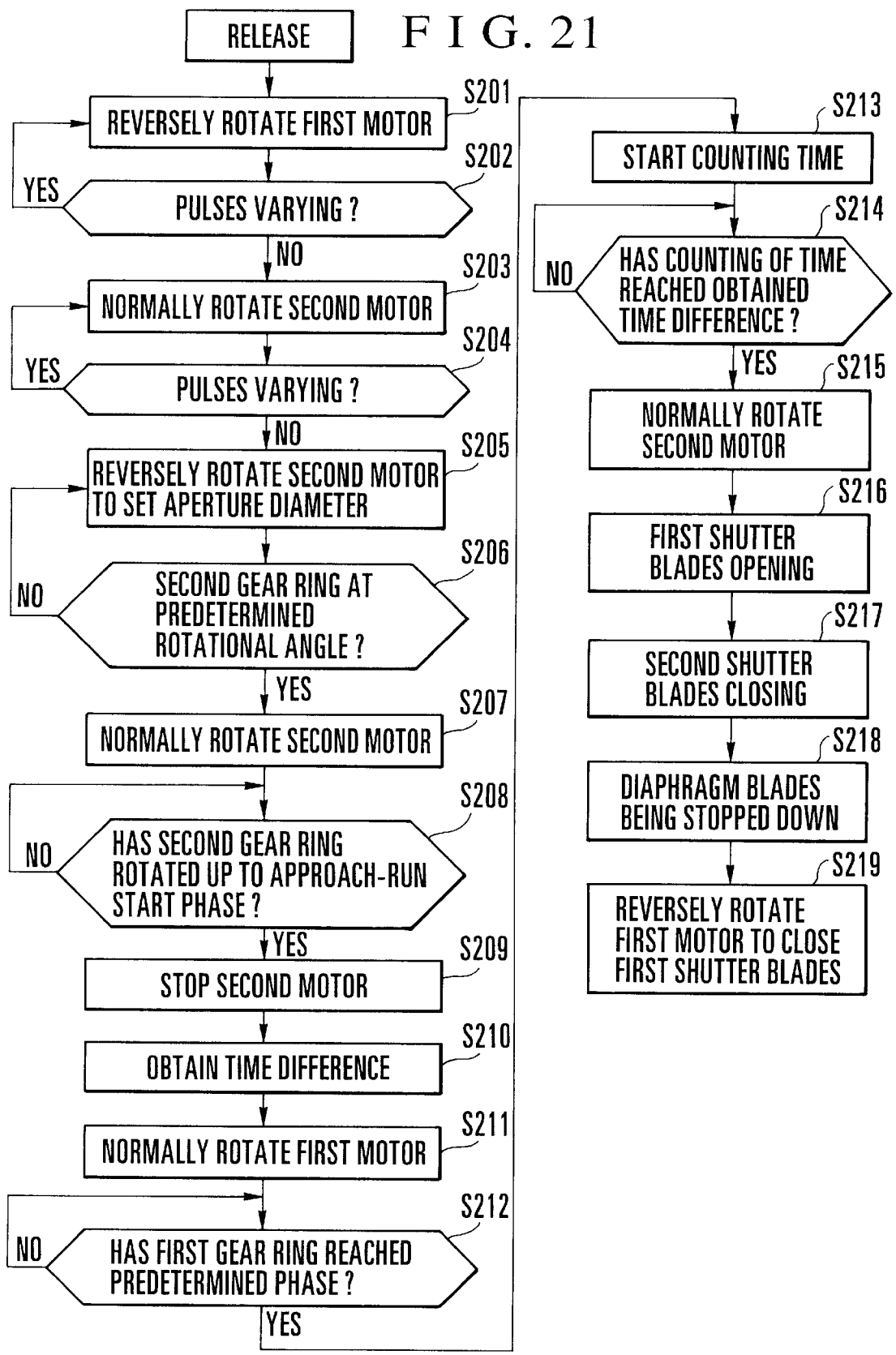
FIG. 21 is a flow chart showing an operation of the shutter device according to a third embodiment of the invention.

With the above-described construction, in the state that the first shutter blades 22 are in the closed condition, the second shutter blades 10 are in the closed condition and the diaphragm blades 11 is in the fully-closed condition, i.e., in the state that the shutter release operation has ended, if the control circuit 26 receives a release signal produced when the photographer conducts the release operation, the first motor 16 is first rotated in the reverse direction (step S201 in FIG. 21).

With the reverse rotation of the first motor 16, the pinion 17, the gear (A) 18, the gear (B) 19 and the first gear ring 20 are respectively rotated in the reverse direction, so that the projection 20a of the first gear ring 20 comes into contact with the pin portion 21a of the first cam ring 21 to cause the first cam ring 21 to rotate in the reverse direction.

The reverse rotation of the first motor 16 continues until the pin portion 21a of the first cam ring 21 comes into contact with the closing-side stopper portion 5b of the fifth base member 5 so that the first cam ring 21 stops rotating and the pulses caused by the pulse plate 23 remain unvaried for a predetermined period of time (step S202 in FIG. 21).

Thus, it is confirmed that the first shutter blades 22 are in the closed condition, and such a position as shown in FIG. 6 is set as an initial position for the approach-run of the first gear ring 20.

In this state, the second motor 6 is energized to rotate the second gear ring 8 in the normal direction (step S203 in FIG. 21).

Owing to the normal rotation of the second motor 6, the pinion 7 and the second gear ring 8 rotate in the normal direction, so that the projection 8a of the second gear ring 8 is brought into contact with the pin portion 9a of the second cam ring 9, thereby causing the second cam ring 9 to rotate in the normal direction.

The normal rotation of the second motor 6 continues until the pin portion 9a of the second cam ring 9 comes into contact with the closing-side stopper portion 2f of the second base member 2 so that the second cam ring 9 stops rotating and the pulses caused by the pulse plate 12 remain unvaried for a predetermined period of time (step S204 in FIG. 21).

Thus, it is confirmed that the second shutter blades 10 and the diaphragm blades 11 are in the fully closed condition.

The second motor 6 is energized to rotate in the reverse direction from the position shown in FIG. 10 (step S205 in FIG. 21).

When the second gear ring 8 rotates in the reverse direction to reach the position shown in FIG. 11, the second cam ring 9 is rotated by being pushed by the projection 8a of the second gear ring 8, and the aperture setting portions 9b1 and 9c1 of the cam slots 9b and 9c cause the second shutter blades 10 and the diaphragm blades 11 to open simultaneously.

The measurement of the rotational angle of the second gear ring 8 is made on the basis of the pulses from the pulse plate 12, and the second gear ring 8 is rotated in the reverse direction up to the rotational angle whereby a desired aperture diameter, for example, shown in one of FIGS. 11 to 13 is obtainable, so that the second shutter blades 10 and the diaphragm blades 11 are opened up to the desired aperture diameter (step S206 in FIG. 21).

Irrespective of the dimensions of the desired aperture diameter, the second gear ring 8 is rotated in the normal direction up to a predetermined approach-run start position, i.e., a predetermined rotational angle, by using the pulse plate 12 and the detection circuit 14, and then stops there (steps S207, S208 and S209 in FIG. 21).

Since the approach-run start position of the second gear ring 8 is made constant irrespective of the dimensions of the desired aperture diameter, the length of the approach-run interval becomes constant, so that when the projection 8a of the second gear ring 8 runs against the pin portion 9a of the second cam ring 9, the speed of the second gear ring 8 becomes stable.

In the above-mentioned state, the rotating interval from the initial position for the approach-run of the first gear ring 20 shown in FIG. 6 to the position shown in FIG. 8 where the projection 20a of the first gear ring 20 runs against the pin portion 21a of the first cam ring 21 after the first gear ring 20 rotates in the normal direction is set as the approach-run interval for the first gear ring 20.

Figure 14:
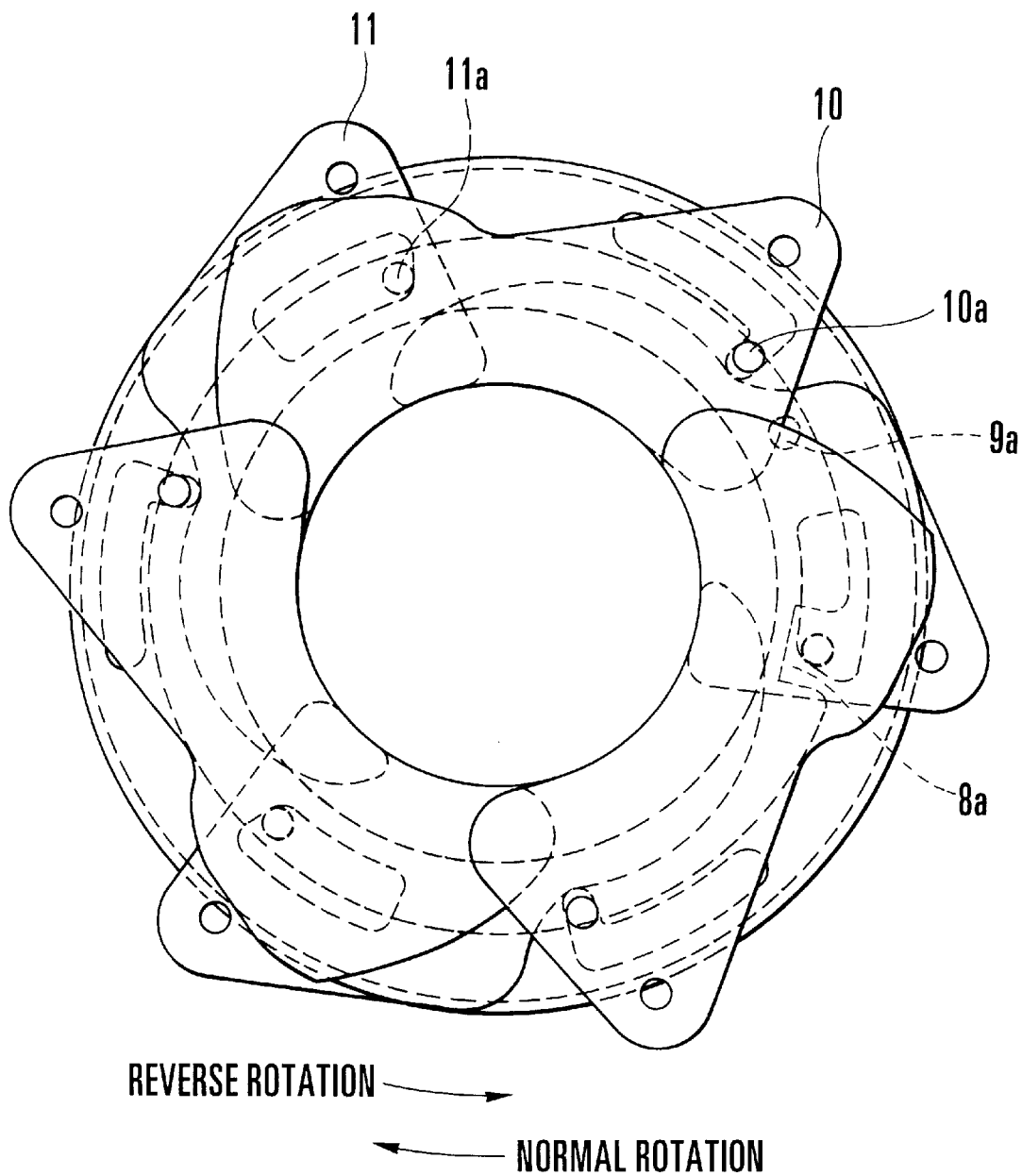
FIG. 14 is a front view showing the positional relationship among the second shutter blades 10, the diaphragm blades 11, the second gear ring 8 and the second cam ring 9 in the closing operation mechanism of the shutter device according to the embodiments of the invention.

Likewise, in the above-mentioned state, the rotating interval from the initial position shown in FIG. 14 for the approach-run of the second gear ring 8 to the position shown in FIG. 15 where the projection 8a of the second gear ring 8 runs against the pin portion 9a of the second cam ring 9 after the second gear ring 8 rotates in the normal direction is set as the approach-run interval for the second gear ring 8.

For providing an adequate shutter speed, there is a need to make accurate the time from when the first shutter blades 22 begin to open until the second shutter blades 10 begin the closing operation.

Accordingly, the control circuit 26 obtains the time difference from when the first gear ring 20 starts the approach run and reaches a predetermined position in FIG. 7 where the control circuit 26 starts the time counting operation until the energization for the normal rotation of the second motor 6 starts (step S210 in FIG. 21).

Then, the first motor 16 is rotated in the normal direction (step S211 in FIG. 21).

Due to the normal rotation of the first motor 16, the pinion 17, the gear (A) 18, the gear (B) 19 and the first gear ring 20 are rotated in the normal direction.

When the first gear ring 20 rotates up to a predetermined angle shown in FIG. 7, the control circuit 26 starts the time counting (step S212 and step S213 in FIG. 21).

The control circuit 26 detects the time counting of only the time difference, obtained by the control circuit 26, from when the first gear ring 20 reaches the position in FIG. 7 at which the time counting operation starts until the energization is started to rotate the second motor 6 in the normal direction (step S214 in FIG. 21), and then the second motor 6 comes into the energized condition to rotate in the normal direction (step S215 in FIG. 21).

The normal rotation of the second motor 6 causes the pinion 7 and the second gear ring 8 to rotate in the normal direction.

When the first gear ring 20 rotates in the normal direction and reaches the position shown in FIG. 8, the projection 20a of the first gear ring 20 runs against the pin portion 21a of the first cam ring 21, thereby causing the first cam ring 21 to rotate in the normal direction.

The first shutter blades 22 are opened by the pin portions 22a which are guided by the cam slots 21b of the first cam ring 21, thereby starting the exposure. Further, when the first cam ring 21 rotates up to the position shown in FIG. 9, the first shutter blades 22 come into the fully open condition, and stop by running against the opening-side stopper portion 4a of the fourth base member 4 (step S216 in FIG. 21).

The first cam ring 21 stops with the pin portion 21a coming into contact with the opening-side stopper portion 5a of the fifth base member 5.

When the second gear ring 8 rotates up to the position shown in FIG. 15, the projection 8a of the second gear ring 8 runs against the pin portion 9a of the second cam ring 9 to bring the second cam ring 9 to rotate. Regardless of the dimensions of the diaphragm aperture diameter, the length of the approach-run interval for the second gear ring 8 becomes constant, so that when the projection 8a of the second gear ring 8 runs against the pin portion of the second cam ring 9, the stable speed of the second gear ring 8 is achievable. Therefore, the rotating speed of the second cam ring 9 after the collision becomes stable regardless of the diaphragm aperture diameter.

The second cam ring 9 is rotated in the normal direction and the closing portions 9b2 of the cam slots 9b coming into contact with the pin portions 10a cause the second shutter blades 10 to first close. Since the rotating speed of the second cam ring 9 is stable irrespective of the diaphragm aperture diameter, the movement of the second shutter blades 10 becomes stable.

Then, as shown in FIG. 16, the second shutter blades 10 are stopped by running against the closing-side stopper portions 2b of the second base member 2 (step S217 in FIG. 21).

The closure of the second shutter blades 10 terminates the exposure.

After the light shielding by the second shutter blades 10, when the second cam ring 9 further rotates in the normal direction to reach the position shown in FIG. 17, the pin portions 11a of the diaphragm blades 11 come into contact with stopping-down portions 9c2 of the cam slots 9c for the diaphragm blades 11, so that, as shown in FIG. 10, the diaphragm blades 11 are stopped down and stops by coming into contact with the closing-side stopper portions 2d of the second base member 2, thereby accomplishing the reset operation of the diaphragm blades 11 (step S218 in FIG. 21).

The second cam ring 9 stops with the pin portion 9a coming into contact with the closing-side stopper portion 2f of the second base member 2.

The normal rotation of the second motor 6 lasts until the pulses caused by the pulse plate 12 remain unvaried for a predetermined period of time, and after the confirmation of the full closure of the second shutter blades 10, the first motor 16 is rotated in the reverse direction to close the first shutter blades 22, as shown in FIG. 6 (step S219 in FIG. 21).

The reverse rotation of the first motor 16 continues until the pulses caused by the pulse plate 23 remain unvaried for a predetermined period of time to verify the full closure of the first shutter blades 22.

The third embodiment realizes a shutter device in which the diaphragm aperture diameter and the exposure time are controllable independently of each other and the diaphragm aperture configuration is close to a circle. In addition, since the approach-run start position of the second gear ring 8 becomes constant irrespective of the dimensions of the diaphragm aperture diameter, the length of the approach-run interval becomes always constant, and the speed of the second gear ring 8 becomes stable when the projection 8a of the second gear ring 8 runs against the pin portion 9a of the second cam ring 9. Accordingly, the rotating speed of the second cam ring 9 after the collision becomes stable irrespective of the diaphragm aperture diameter, so that it is possible to make a high-speed shutter operation stable.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A shutter device comprising:
   a) shutter blades;
   b) a motor which drives said shutter blades;
   c) an aperture blade which moves from a position corresponding to a desired aperture value by being driven by said motor; and
   d) a transmission mechanism which transmits a driving force of said motor to said shutter blades and said aperture blade,
   wherein said transmission mechanism transmits the driving force of said motor to said shutter blades and said aperture blade in such a manner that driving of said shutter blades by said motor and driving of said aperture blade by said motor are made sequential.

2. A shutter device according to claim 1, wherein said transmission mechanism does not transmit the driving force of said motor to said aperture blade while said shutter blades are being driven by said motor to perform an exposure operation.

3. A shutter device comprising:
   a) shutter blades;
   b) a motor which drives said shutter blades;
   c) an aperture blade which moves from a position corresponding to a desired aperture value by being driven by said motor; and
   d) a transmission mechanism which transmits a driving force of said motor to said shutter blades and said aperture blade,
   wherein said transmission mechanism transmits the driving force of said motor only to said shutter blades and does not transmit the driving force of said motor to said aperture blade while said shutter blades are being driven to perform an exposure operation.

4. A shutter device according to claim 3, wherein, where a rotating direction of said motor during the exposure operation by said shutter blades is taken as a first rotating direction and a direction opposite to the first rotating direction is taken as a second rotating direction, said transmission mechanism concurrently transmits the driving force of said motor both to said shutter blades and said aperture blade when said motor rotates in the second rotating direction.

5. A shutter device according to claim 4, further comprising a motor control circuit which controls said motor to have different driving speeds between when said motor is driven to rotate in the first rotating direction and when said motor is driven to rotate in the second rotating direction.

6. A shutter device according to claim 5, wherein said motor control circuit controls said motor such that the driving speed to be taken when said motor is driven to rotate in the second rotating direction is lower than the driving speed to be taken when said motor is driven to rotate in the first rotating direction.

7. A shutter device comprising:
   a) first shutter blades which move in an opening direction during an exposure operation;
   b) a first motor which drives said first shutter blades;
   c) second shutter blades which move in a closing direction during the exposure operation;
   d) a second motor which drives said second shutter blades; and
   e) diaphragm blades which are driven by said second motor to perform opening and closing operations.

8. A shutter device according to claim 7, wherein, before said first shutter blades initiate the exposure operation, said diaphragm blades and said second shutter blades are driven by said second motor to move from an initial position to a position corresponding to a desired aperture value.

9. A shutter device according to claim 8, wherein said shutter blades move in the closing direction from the position corresponding to the desired aperture value during the exposure operation.

10. A shutter device according to claim 7, wherein, before said first shutter blades initiate the exposure operation, said diaphragm blades are driven by said second motor to move from an initial position to a position corresponding to a desired aperture value, and after said second shutter blades terminate the exposure operation, said diaphragm blades are driven by said second motor to move from the position corresponding to the desired aperture value to the initial position.

11. A shutter device according to claim 7, wherein, where a rotating direction of said second motor during the exposure operation by said second shutter blades is taken as a first rotating direction and a direction opposite to the first rotating direction is taken as a second rotating direction, said second shutter blades and said diaphragm blades simultaneously move from an initial position to a position corresponding to a desired aperture value when said second motor rotates in the second rotating direction.

12. A shutter device according to claim 7, further comprising a transmission mechanism which transmits a driving force of said second motor to said second shutter blades and said diaphragm blades, wherein said transmission mechanism transmits the driving force of said second motor only to said second shutter blades without transmitting the driving force of said second motor to said diaphragm blades while said second shutter blades are being driven during the exposure operation.

13. A shutter device according to claim 7, wherein said transmission mechanism transmits the driving force of said second motor to said diaphragm blades after said second shutter blades terminate the exposure operation.

14. An apparatus having a shutter device comprising:
    a) shutter blades;
    b) a motor which drives said shutter blades;
    c) an aperture blade which moves from a position corresponding to a desired aperture value by being driven by said motor; and
    d) a transmission mechanism which transmits a driving force of said motor to said shutter blades and said aperture blade,
    wherein said transmission mechanism transmits the driving force of said motor to said shutter blades and said aperture blade in such a manner that driving of said shutter blades by said motor and driving of said aperture blade by said motor are made sequential.

15. An apparatus according to claim 14, wherein said transmission mechanism does not transmit the driving force of said motor to said aperture blade while said shutter blades are being driven by said motor to perform an exposure operation.

16. An apparatus having a shutter device, comprising:
    a) shutter blades;
    b) a motor which drives said shutter blades;
    c) an aperture blade which moves from a position corresponding to a desired aperture value by being driven by said motor; and
    d) a transmission mechanism which transmits a driving force of said motor to said shutter blades and said aperture blade,
    wherein said transmission mechanism transmits the driving force of said motor only to said shutter blades and does not transmit the driving force of said motor to said aperture blade while said shutter blades are being driven to perform an exposure operation.

17. An apparatus according to claim 16, wherein, where a rotating direction of said motor during the exposure operation by said shutter blades is taken as a first rotating direction and a direction opposite to the first rotating direction is taken as a second rotating direction, said transmission mechanism concurrently transmits the driving force of said motor both to said shutter blades and said aperture blade when said motor rotates in the second rotating direction.

18. An apparatus according to claim 17, further comprising a motor control circuit which controls said motor to have different driving speeds between when said motor is driven to rotate in the first rotating direction and when said motor is driven to rotate in the second rotating direction.

19. An apparatus according to claim 18, wherein said motor control circuit controls said motor such that the driving speed to be taken when said motor is driven to rotate in the second rotating direction is lower than the driving speed to be taken when said motor is driven to rotate in the first rotating direction.

20. An apparatus having a shutter device, comprising:
    a) first shutter blades which move in an opening direction during an exposure operation;
    b) a first motor which drives said first shutter blades;
    c) second shutter blades which move in a closing direction during the exposure operation;
    d) a second motor which drives said second shutter blades; and
    e) diaphragm blades which are driven by said second motor to perform opening and closing operations.

21. An apparatus according to claim 20, wherein, before said first shutter blades initiate the exposure operation, said diaphragm blades and said second shutter blades are driven by said second motor to move from an initial position to a position corresponding to a desired aperture value.

22. An apparatus according to claim 21, wherein said second shutter blades move in the closing direction from the position corresponding to the desired aperture value during the exposure operation.

23. An apparatus according to claim 20, wherein, before said first shutter blades initiate the exposure operation, said diaphragm blades are driven by said second motor to move from an initial position to a position corresponding to a desired aperture value, and after said second shutter blades terminate the exposure operation, said diaphragm blades are driven by said second motor to move from the position corresponding to the desired aperture value to the initial position.

24. An apparatus according to claim 20, wherein, where a rotating direction of said second motor during the exposure operation by said second shutter blades is taken as a first rotating direction and a direction opposite to the first rotating direction is taken as a second rotating direction, said second shutter blades and said diaphragm blades simultaneously move from an initial position to a position corresponding to a desired aperture value when said second motor rotates in the second rotating direction.

25. An apparatus according to claim 20, further comprising a transmission mechanism which transmits a driving force of said second motor to said second shutter blades and said diaphragm blades, wherein said transmission mechanism transmits the driving force of said second motor only to said second shutter blades without transmitting the driving force of said second motor to said diaphragm blades while said second shutter blades are being driven during the exposure operation.

26. An apparatus according to claim 20, wherein said transmission mechanism transmits the driving force of said second motor to said diaphragm blades after said second shutter blades terminate the exposure operation.

27. A shutter device according to claim 7, wherein said diaphragm blades and said second shutter blades are driven by said second motor, before said first shutter blades start an exposure operation, to move from an initial position to a position corresponding to a desired aperture value, and thereafter only said second shutter blades are further driven by said second motor to move to a predetermined running start position.

28. An apparatus according to claim 20, wherein said diaphragm blades and said second shutter blades are driven by said second motor, before said first shutter blades start an exposure operation, to move from an initial position to a position corresponding to a desired aperture value, and thereafter only said second shutter blades are further driven by said second motor to move to a predetermined running start position.

* * * * *

UNITED STATES PATENT AND TRADEMARK OFFICE
CERTIFICATE OF CORRECTION

PATENT NO. : 6,089,760
DATED : July 18, 2000
INVENTOR(S) : Shuichi Terada

It is certified that error appears in the above-identified patent and that said Letters Patent is hereby corrected as shown below:

<u>Column 1,</u>
Line 12, delete "6-25026" and insert -- 6-250260 --.

Signed and Sealed this

Twentieth Day of November, 2001

Attest:

*Nicholas P. Godici*

NICHOLAS P. GODICI
*Attesting Officer*    *Acting Director of the United States Patent and Trademark Office*